(12) United States Patent
Velusamy et al.

(10) Patent No.: US 9,986,080 B2
(45) Date of Patent: May 29, 2018

(54) MOBILE DEVICE AND METHOD FOR DISPLAYING INFORMATION ABOUT FILES STORED IN A PLURALITY OF STORAGE DEVICES

(71) Applicant: SanDisk Technologies LLC, Plano, TX (US)

(72) Inventors: Sivaraj Velusamy, Erode (IN); Sreeram Rajagopalan, Sunnyvale, CA (US); Vithya Kannappan, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 0 days. days.

(21) Appl. No.: 15/295,613

(22) Filed: Oct. 17, 2016

(65) Prior Publication Data

US 2017/0374186 A1    Dec. 28, 2017

(30) Foreign Application Priority Data

Jun. 24, 2016  (IN) .............................. 201641021755

(51) Int. Cl.
| | |
|---|---|
| *H04M 1/725* | (2006.01) |
| *G06F 17/30* | (2006.01) |
| *G06F 9/44* | (2018.01) |
| *G06F 3/06* | (2006.01) |
| *H04L 29/08* | (2006.01) |

(52) U.S. Cl.
CPC ........ *H04M 1/72522* (2013.01); *G06F 3/065* (2013.01); *G06F 3/0619* (2013.01); *G06F 3/0685* (2013.01); *G06F 9/4411* (2013.01);

*G06F 17/30091* (2013.01); *H04M 1/72583* (2013.01); *H04L 67/1097* (2013.01)

(58) Field of Classification Search
CPC .... G06F 3/0653; G06F 3/0662; G06F 3/0664; G06F 3/0665; G06F 3/0667; G06F 3/065; G06F 3/0685; G06F 17/30091; H04M 1/72522
See application file for complete search history.

(56) References Cited

U.S. PATENT DOCUMENTS

| | | |
|---|---|---|
| 6,674,358 B1 | 1/2004 | Tinsley |
| 7,832,645 B2 | 11/2010 | Chen et al. |

(Continued)

OTHER PUBLICATIONS

San-Disk Connect—Wireless Media Drive & Wireless Flash Drive, http://www.sandisk.com/products/wireless/, 1 page, printed Nov. 14, 2013.

(Continued)

*Primary Examiner* — Devan Sandiford
(74) *Attorney, Agent, or Firm* — Brinks Gilson & Lione

(57) ABSTRACT

A mobile device with a unified media-centric user interface is provided. In one embodiment, the user interface contains one or more of the following features: a unified view of the home screen, navigating between various storage locations, dragging items to collection/folder, pinch and zoom feature, stats shown for each file type, storage usage view from the app, manual and automatic backup, and magic move (keeping a low-resolution version of the original files while moving). Other embodiments are possible, and each of the embodiments can be used alone or together in combination.

18 Claims, 30 Drawing Sheets

(56) References Cited

U.S. PATENT DOCUMENTS

| | | |
|---|---|---|
| 8,483,758 B2 | 7/2013 | Huang |
| 8,521,956 B2 | 8/2013 | Della Pia et al. |
| 8,864,019 B2 | 10/2014 | Hashimoto |
| 9,374,788 B2 | 6/2016 | Singamsetti |
| 2004/0070499 A1 | 4/2004 | Sawinski |
| 2007/0008118 A1 | 1/2007 | Kassiedass |
| 2007/0026906 A1 | 2/2007 | Macfarlane |
| 2008/0293274 A1 | 11/2008 | Milan |
| 2009/0096413 A1 | 4/2009 | Partovi et al. |
| 2009/0152361 A1 | 6/2009 | Narendra et al. |
| 2009/0287636 A1 | 11/2009 | Ren et al. |
| 2009/0300227 A1* | 12/2009 | Nochimowski ..... G06F 11/3409 710/18 |
| 2010/0185786 A1 | 7/2010 | Wood |
| 2011/0050164 A1 | 3/2011 | Partovi et al. |
| 2011/0063104 A1 | 3/2011 | Idzik |
| 2011/0175461 A1 | 7/2011 | Tinaphong |
| 2011/0185098 A1 | 7/2011 | Kim et al. |
| 2011/0241607 A1 | 10/2011 | Wiegers |
| 2011/0252018 A1* | 10/2011 | Bhose ............... G06F 17/30864 707/711 |
| 2012/0196530 A1 | 8/2012 | Moosavi |
| 2012/0287231 A1 | 11/2012 | Ravi et al. |
| 2013/0036135 A1* | 2/2013 | Brockey ............. G06F 17/3028 707/770 |
| 2013/0047084 A1* | 2/2013 | Sanders ............ G06F 17/30053 715/716 |
| 2013/0301522 A1 | 11/2013 | Krishna et al. |
| 2014/0040811 A1* | 2/2014 | Brahmanapalli ..... G06F 3/0486 715/781 |
| 2014/0113550 A1 | 4/2014 | Li |
| 2014/0273845 A1 | 9/2014 | Russell |
| 2014/0282938 A1* | 9/2014 | Moisa ................ G06F 21/6218 726/6 |
| 2014/0342663 A1 | 11/2014 | Eaton |
| 2014/0364055 A1 | 12/2014 | Geris |
| 2015/0186398 A1* | 7/2015 | Yan ................... G06F 17/30268 715/777 |
| 2015/0186478 A1* | 7/2015 | Yan ................... G06F 17/30268 707/722 |
| 2015/0186538 A1* | 7/2015 | Yan ................... G06F 17/30268 707/722 |
| 2015/0258415 A1* | 9/2015 | Trivedi ............. H04M 1/72522 700/91 |
| 2015/0280789 A1 | 10/2015 | Hussain |
| 2015/0286835 A1* | 10/2015 | Azoulai ............. G06F 21/6218 713/193 |
| 2016/0125098 A1* | 5/2016 | Childs ............... G06F 17/30991 707/728 |
| 2016/0127339 A1* | 5/2016 | Childs ............... G06F 17/30165 726/7 |
| 2016/0179855 A1* | 6/2016 | Roman ................ H04L 63/08 707/744 |
| 2016/0203386 A1* | 7/2016 | Porecki ................ G06T 11/00 382/159 |
| 2017/0091208 A1* | 3/2017 | Quan ............... G06F 17/30091 |

OTHER PUBLICATIONS iExpander—An Expansion Drive for your iPhone, http://www.kickstarter.com/projects/108290897/iexpander-an-expansion-device-for-your-iphone-4-an, 24 pages, printed Nov. 14, 2013.

Cooper, D., "D-Link's All in One Mobile Companion is Gonna Lighten the Load of Your Checked Baggage", http://www.engadget.com/2012/01/10/d-link-all-in-one-mobile-companion/&ie=UTF-8&oe=UTF-8, Jan. 10, 2012, 6 pages.

"D-Link User Manual All-in-one Mobile Companion DIR-505", http://www.dlink.com/-/media/Consumer_Products/DIR/DIR%20505/Manual/DIR_505_Manual_US.pdf, Version 1.0, Mar. 29, 2012, D-Link Systems, Inc., 200 pages.

"SharePort Mobile Companion DIR-505", http://www.dlink.com/us/en/home-solutions/connect/portable-routers/dir-505-sharepoint-mobile-companion, D-Link Systems, Inc., printed Aug. 5, 2013, 15 pages.

Application as filed for U.S. Appl. No. 13/565,472 entitled, "Wireless Power Transfer", filed Aug. 2, 2012, 40 pages.

Office Action for U.S. Appl. No. 13/565,472 dated Nov. 5, 2015, 14 pages.

Office Action in U.S. Appl. No. 13/565,472 dated May 18, 2016, 13 pages.

Notice of Allowance in U.S. Appl. No. 13/565,472, dated Sep. 29, 2016, 8 pages.

Application as filed for U.S. Appl. No. 14/134,679 entitled, "Mobile Device Peripheral", filed Dec. 19, 2013, 27 pages.

Office Action for U.S. Appl. No. 14/134,679 dated Jun. 18, 2015, 20 pages.

Office Action for U.S. Appl. No. 14/134,679 dated Jan. 12, 2016, 19 pages.

Notice of Allowance in U.S. Appl. No. 14/134,679, dated Apr. 26, 2016, 7 pages.

Application as filed for U.S. Appl. No. 14/925,786 entitled, "Mobile Device Case and Method for Use Therewith", filed Oct. 28, 2015, 29 pages.

Office Action in U.S. Appl. No. 14/925,786, dated Aug. 5, 2016, 20 pages.

"Collections—Get Your Files Ordered", printed from the internet: http://neatbytes.com/solidexplorer/index.php/2015/06/12/collections-get-your-files-ordered/, on Oct. 3, 2016, 6 pages.

Screenshots of ES File Explore prior to Jun. 24, 2016, 1 page.

Screenshots of SanDisk Memory Zone prior to Jun. 24, 2016, 1 page.

International Search Report and Written Opinion in corresponding International Application No. PCT/US2017/018900, dated May 24, 2017, 14 pages.

* cited by examiner

MOBILE DEVICE AND METHOD FOR DISPLAYING INFORMATION ABOUT FILES STORED IN A PLURALITY OF STORAGE DEVICES

PRIORITY

This application claims priority to India Patent Application No. 201641021755, filed on Jun. 24, 2016, entitled "Mobile Device with Unified Media-Centric User Interface," the entire disclosure of which is hereby incorporated by reference.

BACKGROUND

Some mobile devices, such as Android smartphones, allow users to save their content in multiple storage locations, such as internal memory, a removable memory card (e.g., a microSD cards), an external storage device (e.g., on-the-go (OTG) dual USB drives), and in various cloud services (e.g., Dropbox, Box, Google Drive, One Drive, etc.). When content is spread across multiple locations, users can easily lose track of their content as they do not get a holistic view of how and where their content is distributed. Also, there is no easy way to move content between these storage end-points. Some mobile device user interfaces are limited to a basic file folder view, which makes navigation between different locations on a mobile user interface complex and frustrating for users. Additionally, the native gallery app on some mobile devices may provide a unified view of the internal and external storage (e.g., microSD) devices but does not offer a view into cloud and OTG drives

BRIEF DESCRIPTION OF THE DRAWINGS

Figure 32:
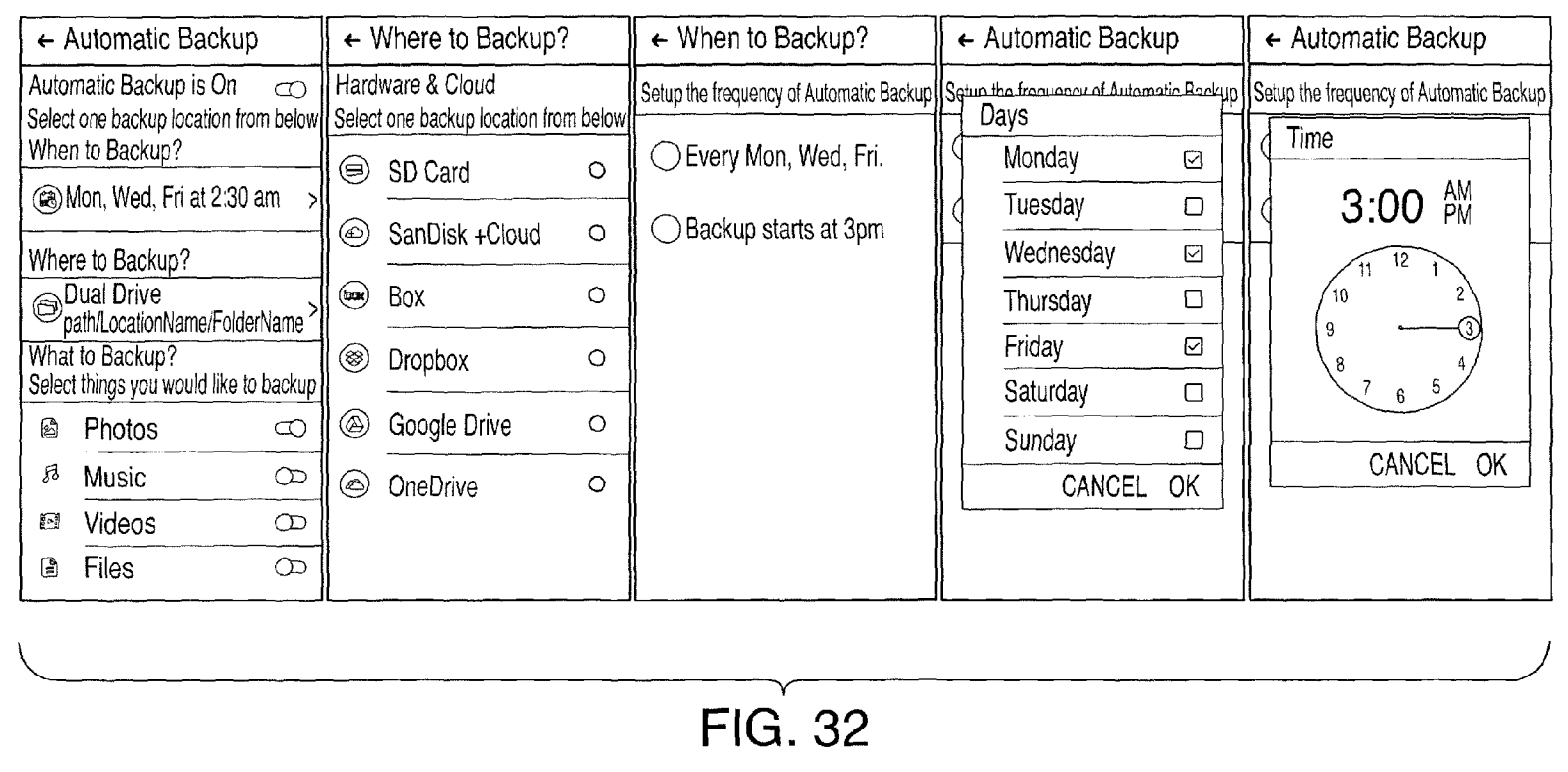
Figures 33, 34:
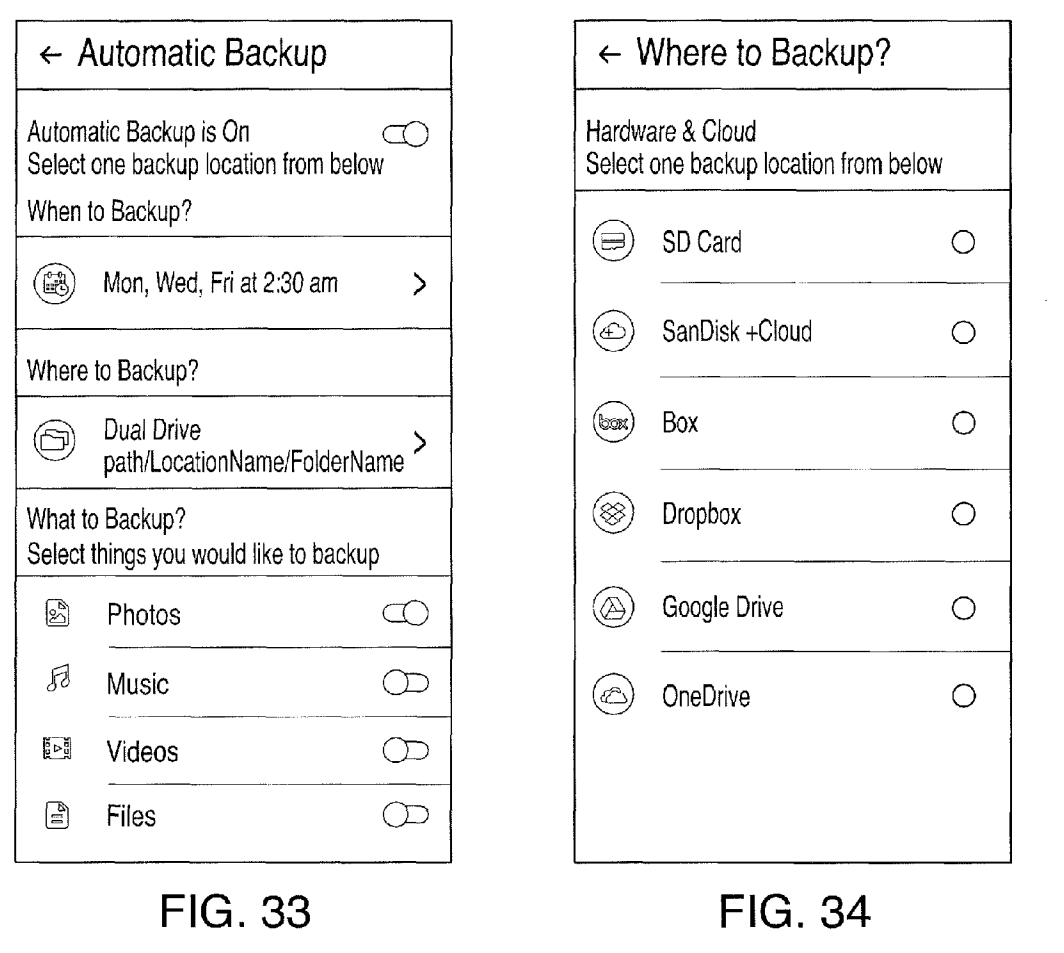

FIGS. 32-36 are screen shots that illustrate an automatic backup process.

DETAILED DESCRIPTION

By way of introduction, the below embodiments relate to a mobile device with a unified media-centric user interface. In one embodiment, the user interface contains one or more of the following features: a unified view of the home screen, navigating between various storage locations, dragging items to collection/folder, pinch and zoom feature, stats shown for each file type, storage usage view from the app, manual and automatic backup, and magic move (keeping a low-resolution version of the original files while moving). Other embodiments are possible, and each of the embodiments can be used alone or together in combination.

Figure 1:
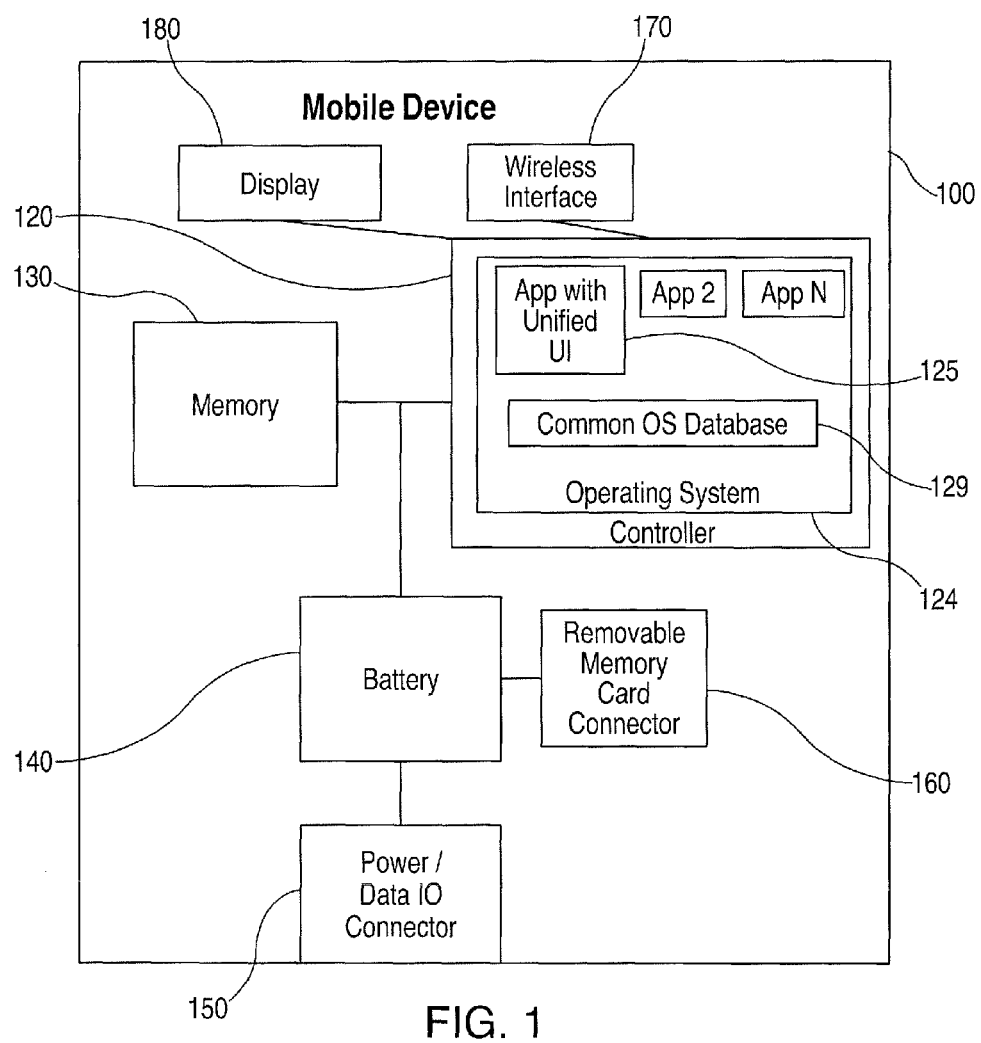
FIG. 1 is an illustration of a mobile device of an embodiment.

Turning now to the drawings, FIG. 1 is an illustration of a mobile device 100 of an embodiment. The mobile device 100 can take any suitable form, such as, but not limited to, a smart phone (e.g., an Apple iPhone, an Android phone), a tablet (e.g., an Apple iPad), a "phablet," a book reader (e.g., an Amazon Kindle), a digital media player (e.g., an iPod), a game device, a personal digital assistant (PDA), a laptop, a wearable computer (e.g., a smart watch or Google Glasses), and any other mobile device where access to additional memory may be desired. As shown in FIG. 1, the mobile device 100 in this embodiment comprises a controller 120 that runs an operating system 124 that runs one or more applications (e.g., computer-readable program code executable by the controller 120) (such as an app 125 with a unified user interface) that communicate with a common operating system database 129, a battery 140, and a port 150 for a power/data JO connector, a port 160 for a removable memory card, a wireless interface 170, and a touch-sensitive display 180. The mobile device 100 can contain different or additional components, which are not shown in FIG. 1 to simplify the drawing. For example, if the mobile device 100 is a mobile smart phone, the mobile device 100 can include hardware and/or software components to make and place telephone calls. The mobile device 100 can also have a camera, a media player, etc. Of course, these are just some examples, and other implementations can be used.

As shown in FIG. 1, the mobile device 100 has a memory 130, which can store content. Content can take any form, including, but not limited to, photos, videos, music, and data attachments. In addition to the internal memory 130, content can be stored on a removable memory device (e.g., a microSD cards) inserted into the removable memory card connector port 160, an external storage device (e.g., on-the-go (OTG) dual USB drives) connected through the data JO connector port 150, and in various cloud services (e.g., Dropbox, Box, Google Drive, One Drive, etc.) in communication with the mobile device 100 via the wireless interface 170. Any suitable wireless technology, now existing or later developed, can be used, including, but not limited to, 802.11 WiFi, near-field communication (NFC), Bluetooth (including Bluetooth Low Energy (LE), Nike+, ANT, ANT+, ZigBee, Radio Frequency for Consumer Electronics (RF4CE), and Infrared Data Association (IrDA).

Figure 2:
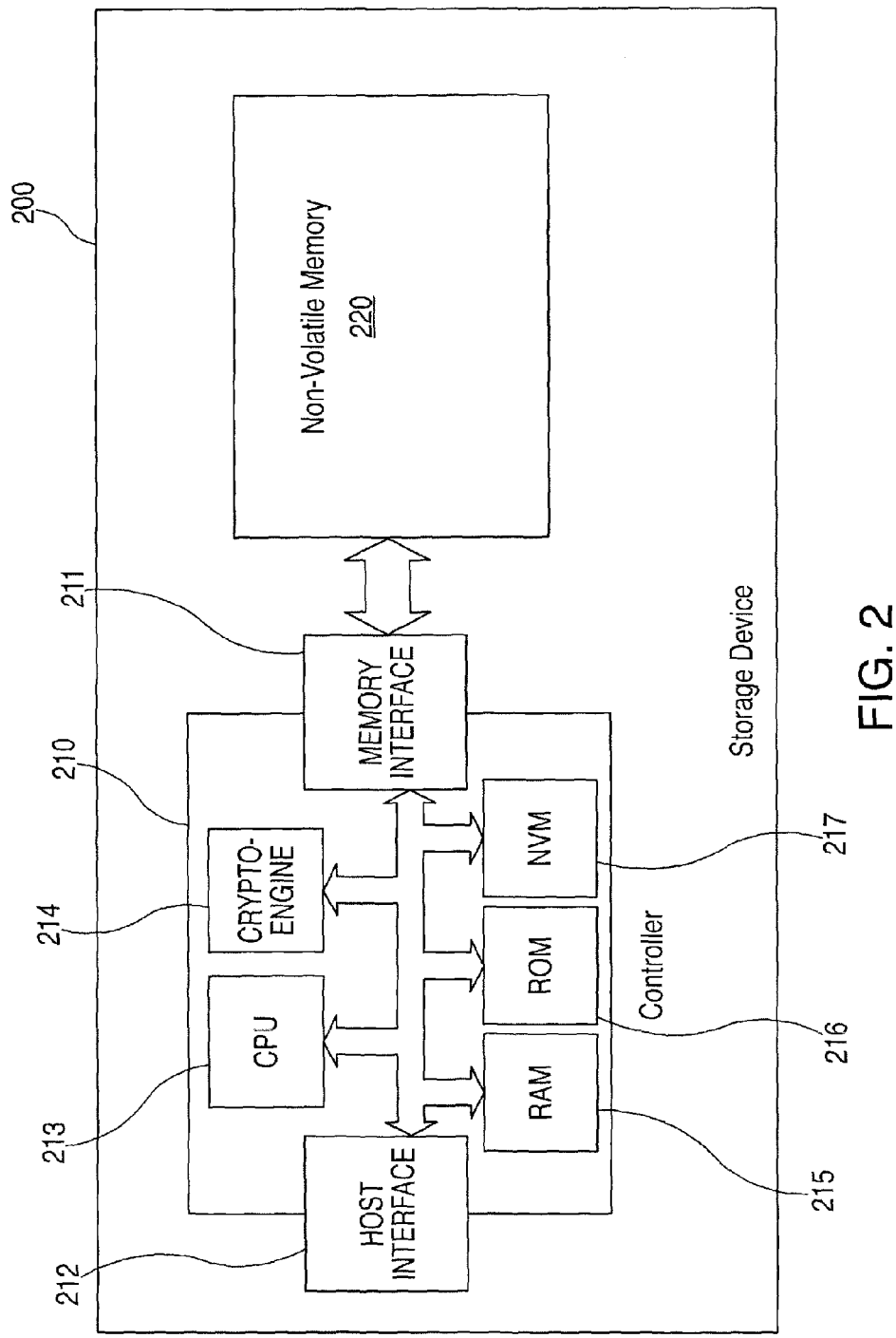
FIG. 2 is a block diagram of a storage device of an embodiment.
Figure 3:
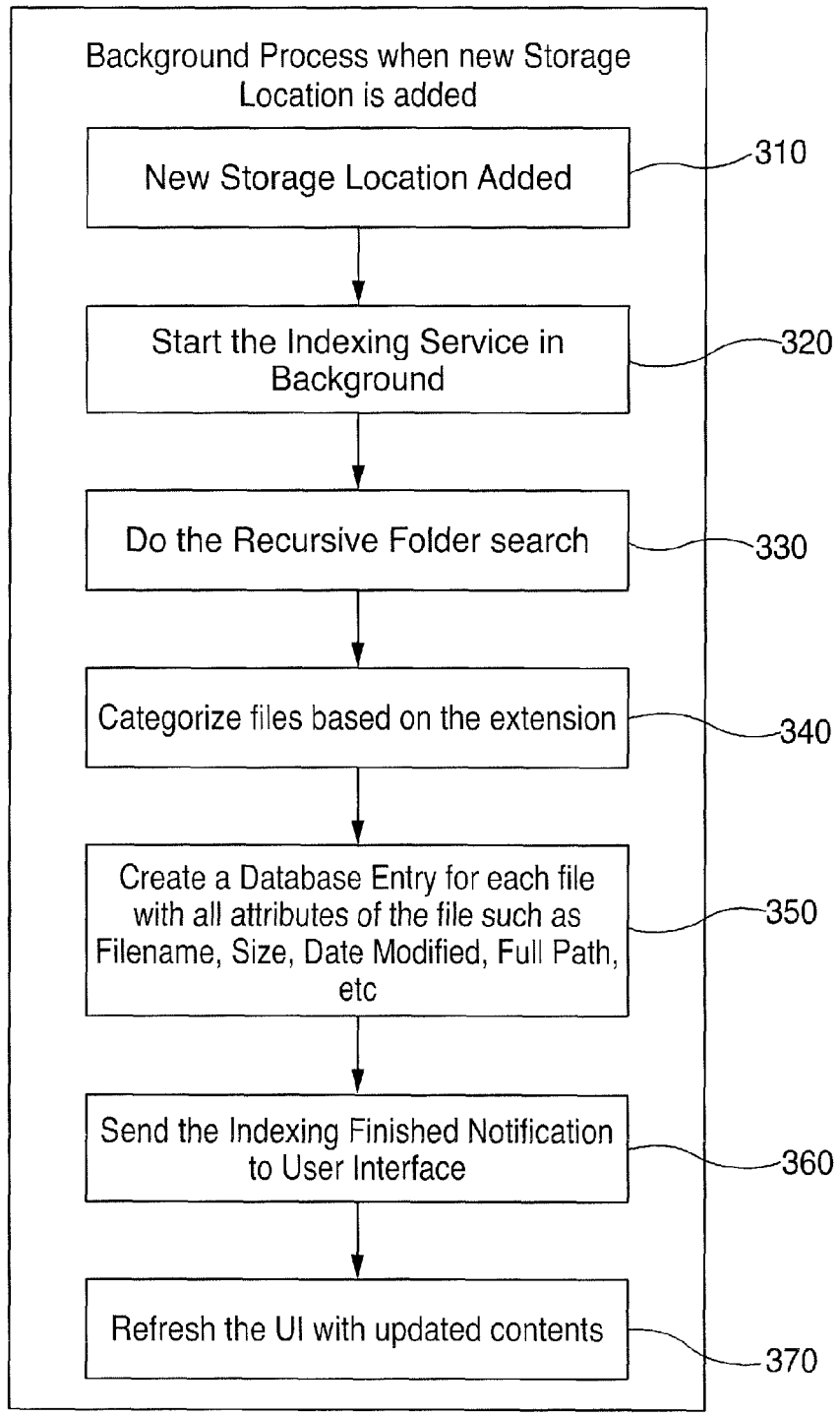
FIG. 3 is a flow chart of a method of an embodiment that is performed when a new storage location is added.
Figure 4:
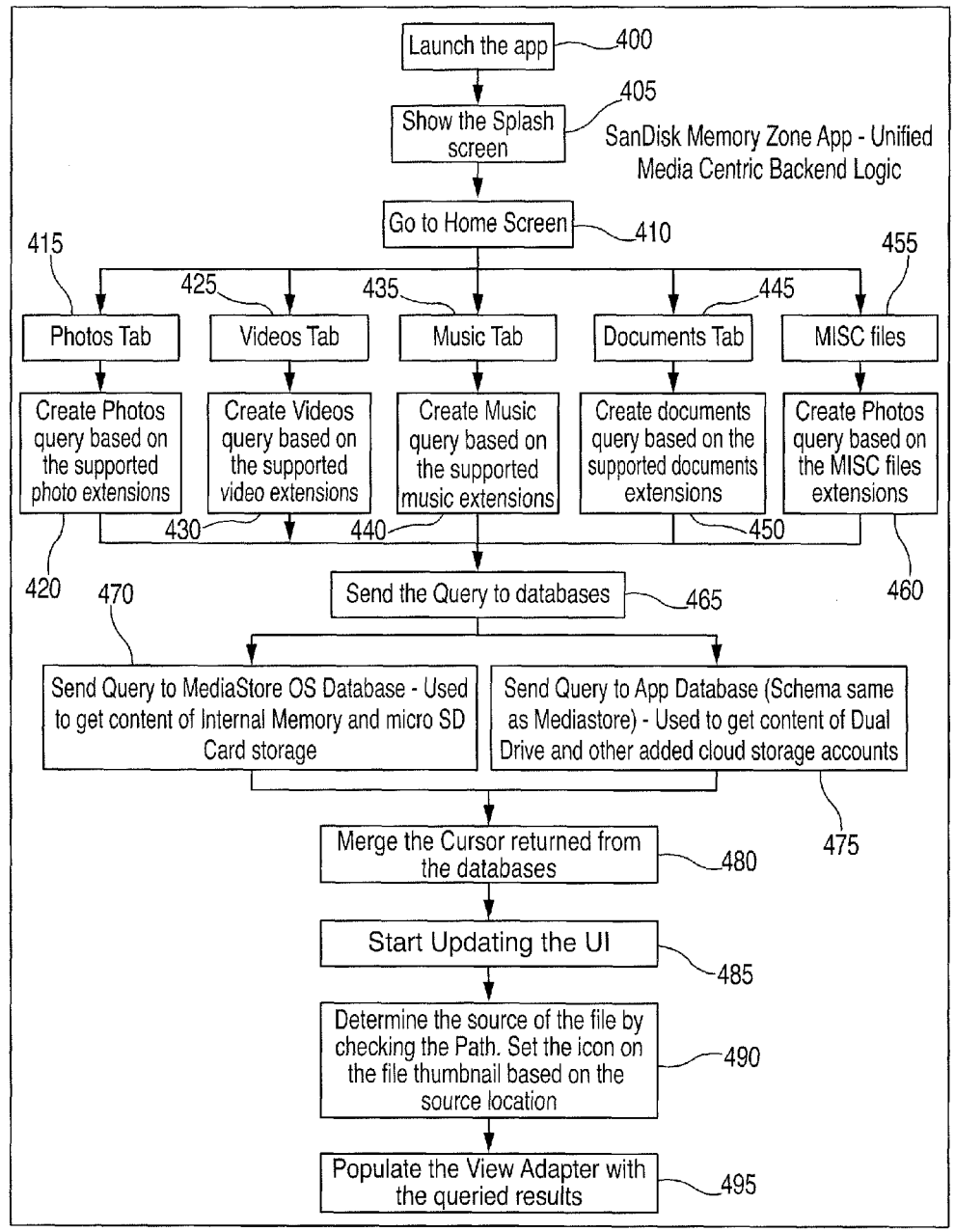
FIG. 4 is a flow chart of a method of an embodiment for a unified media-centric backend logic.
Figure 5:
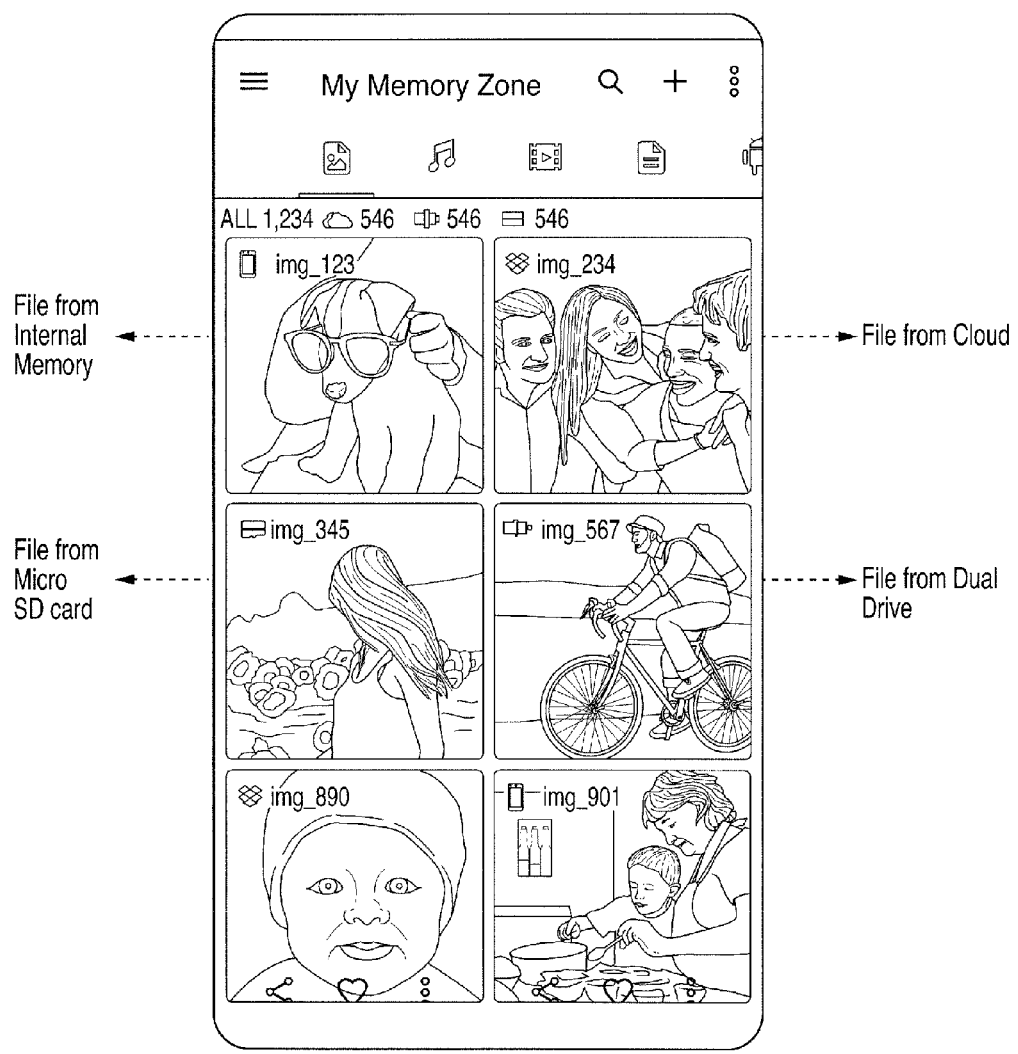
FIGS. 5-15 are screen shots of a unified media-centric user interface of an embodiment.
Figure 6:
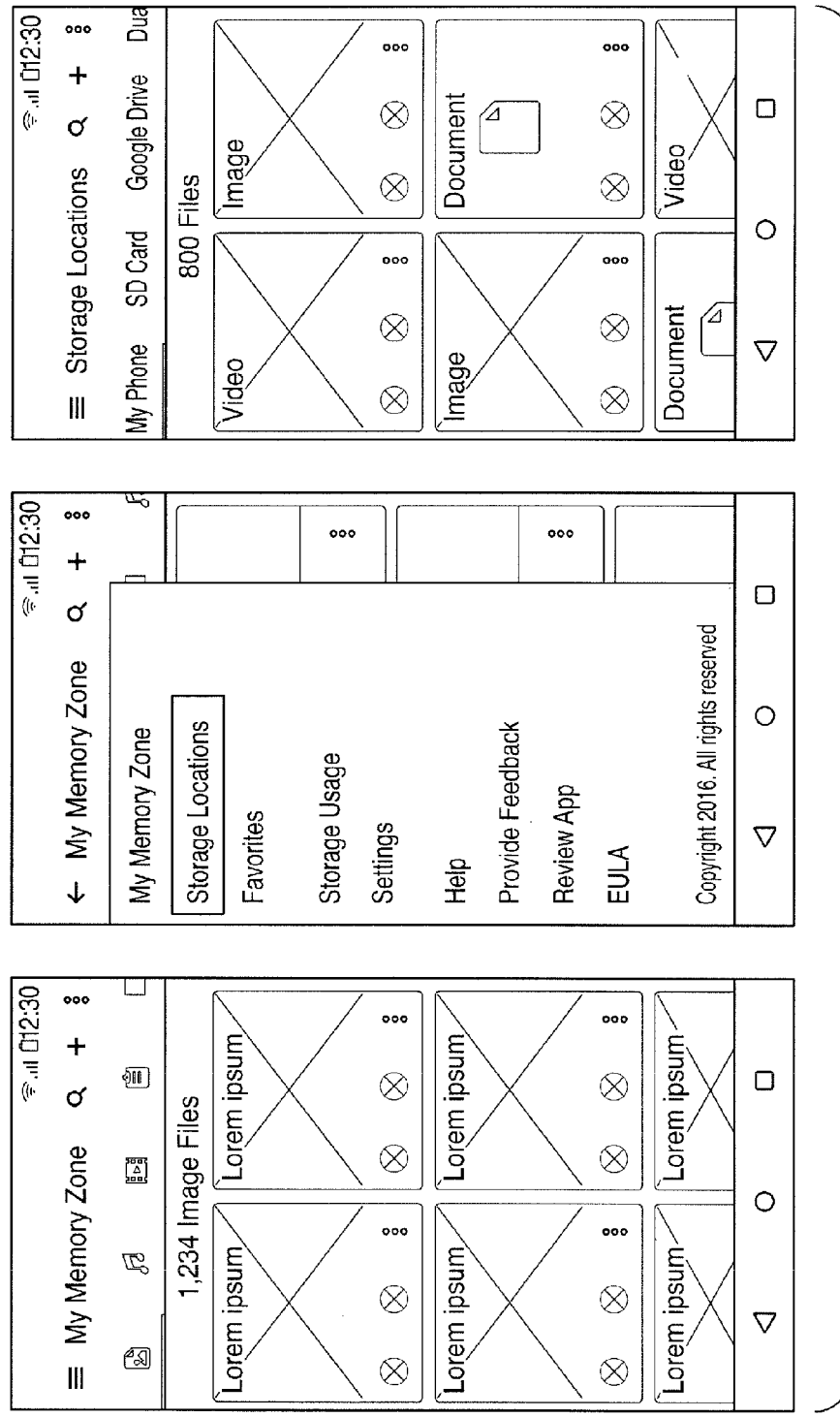
Figure 7:
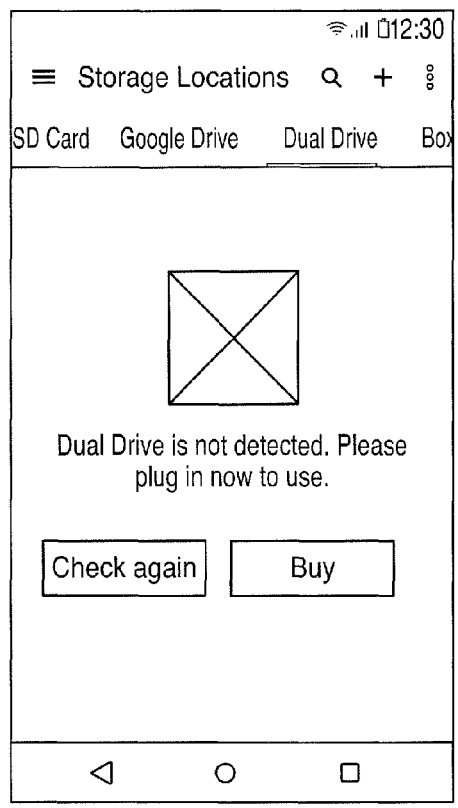
Figure 8:
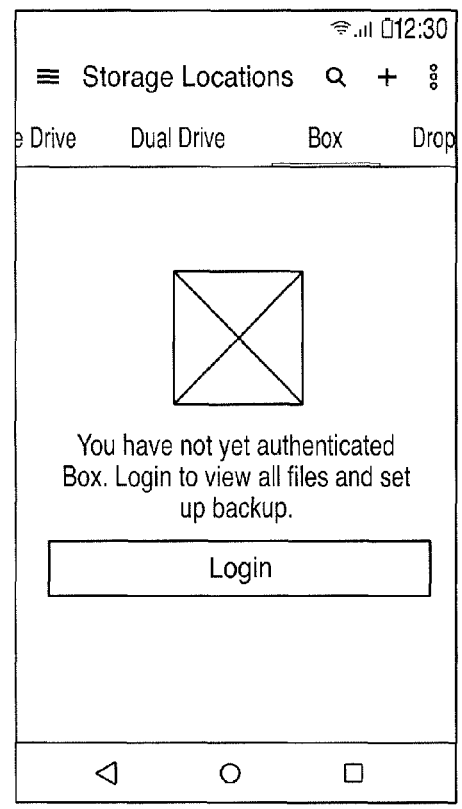
Figure 9:
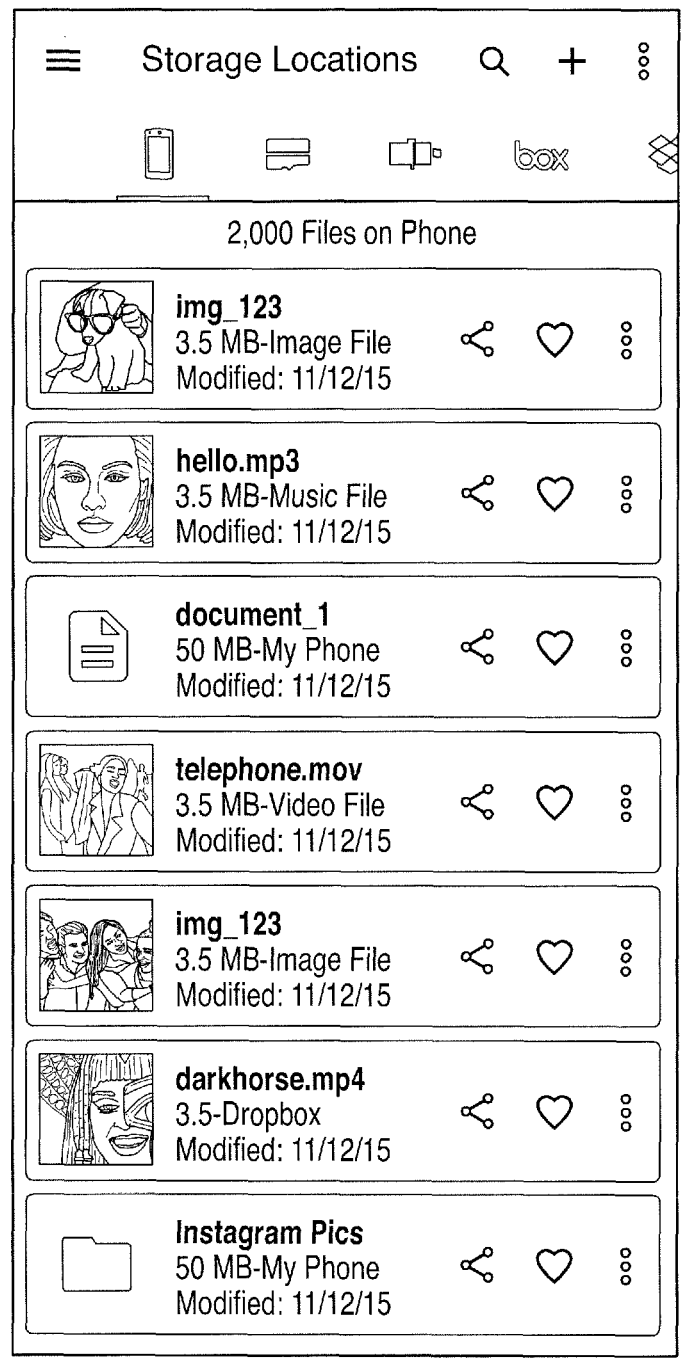
Figure 11:
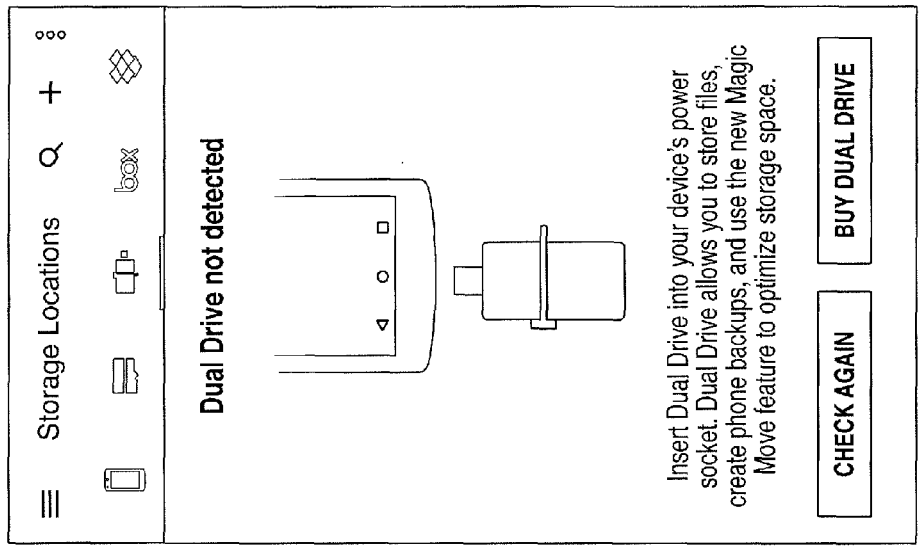
Figure 10:
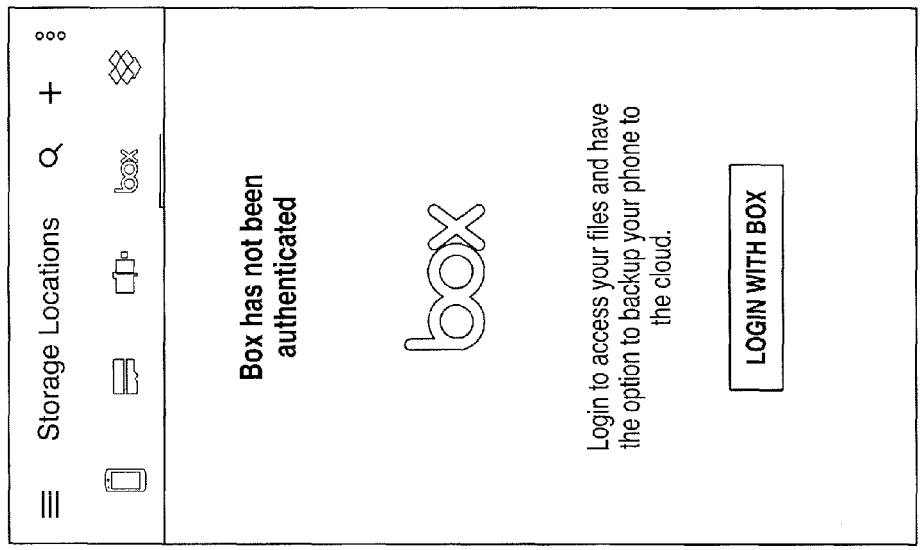
Figure 12:
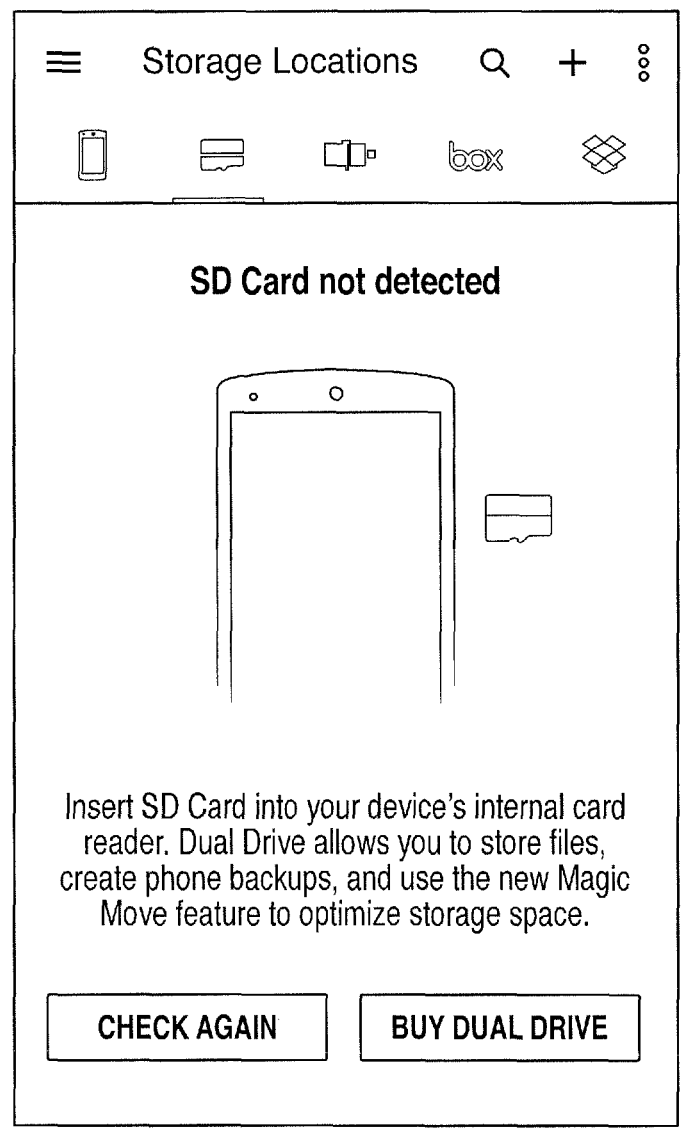
Figure 13:
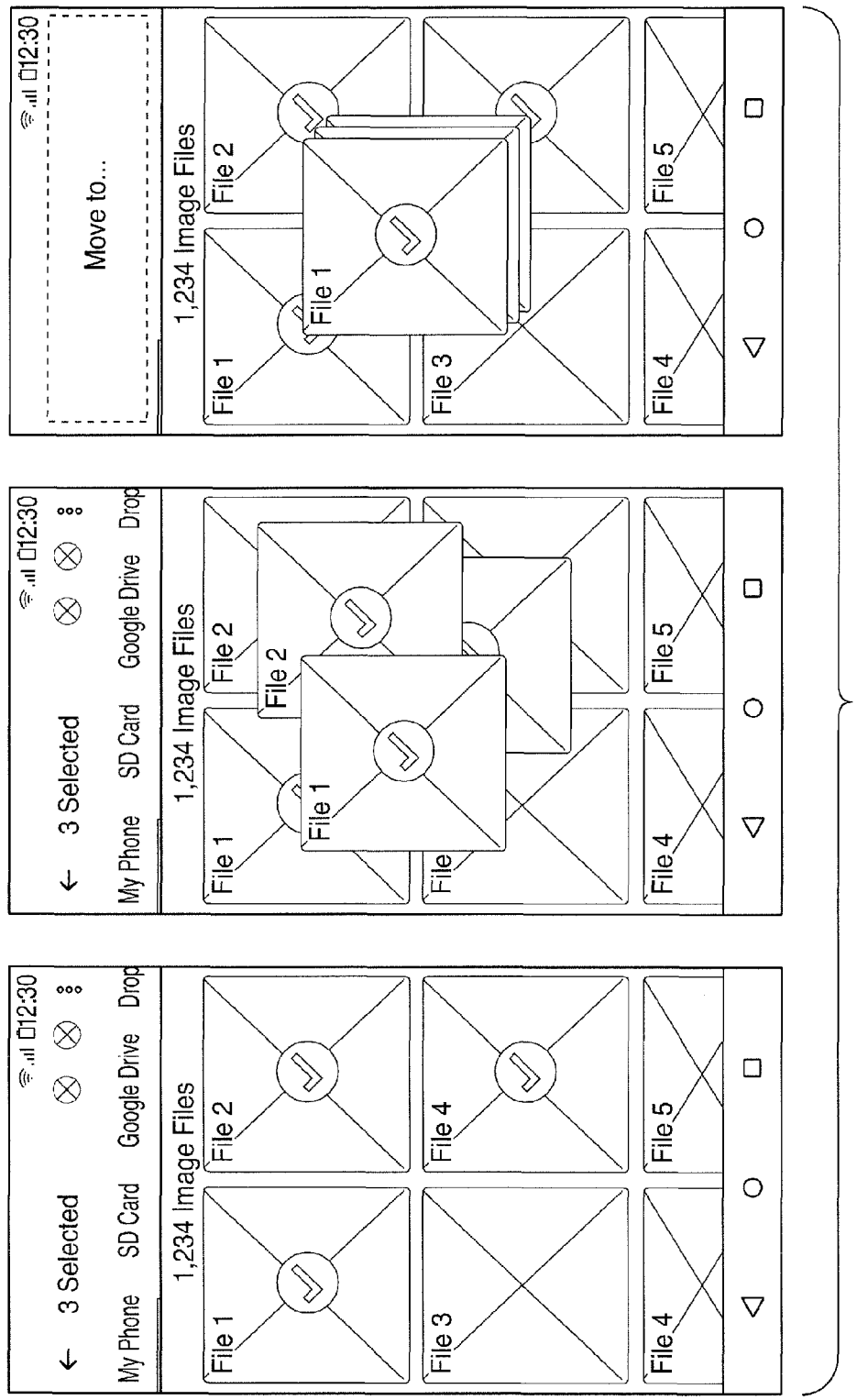
Figure 15:
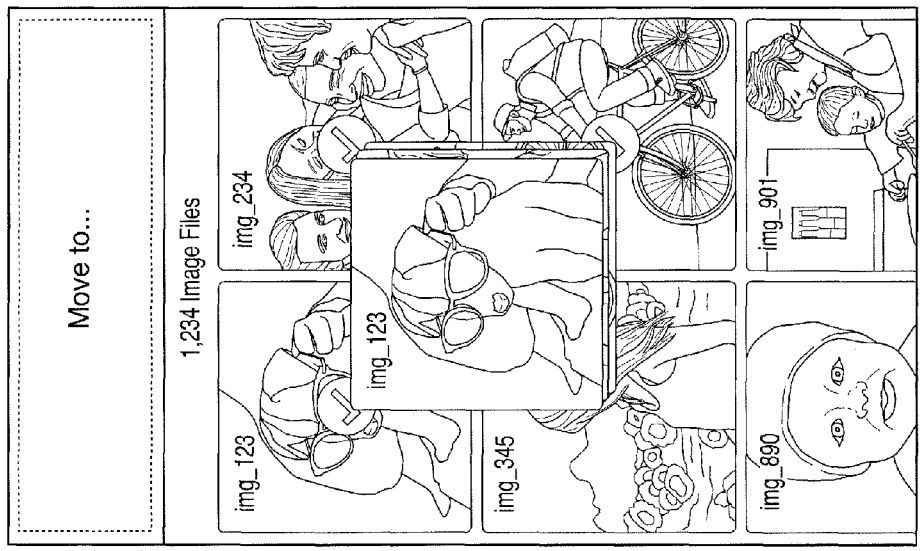
Figure 14:
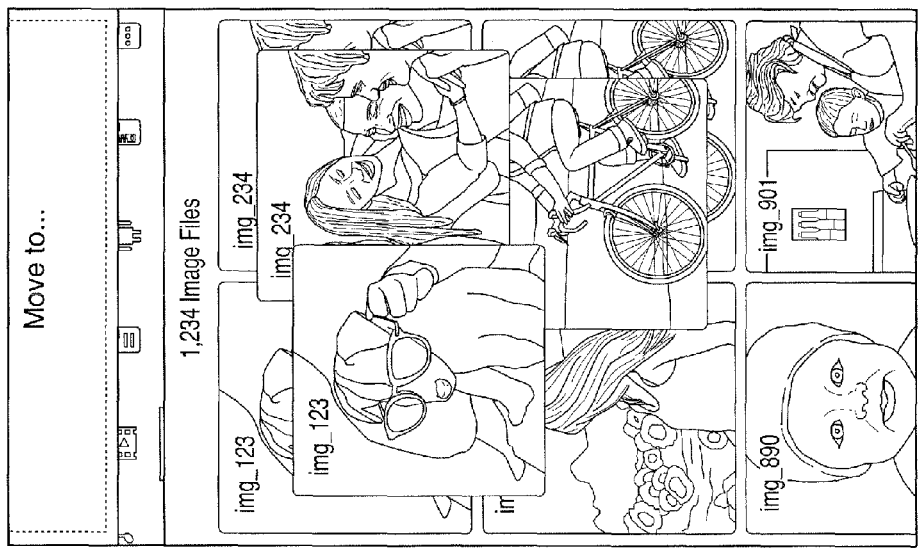
Figure 16:
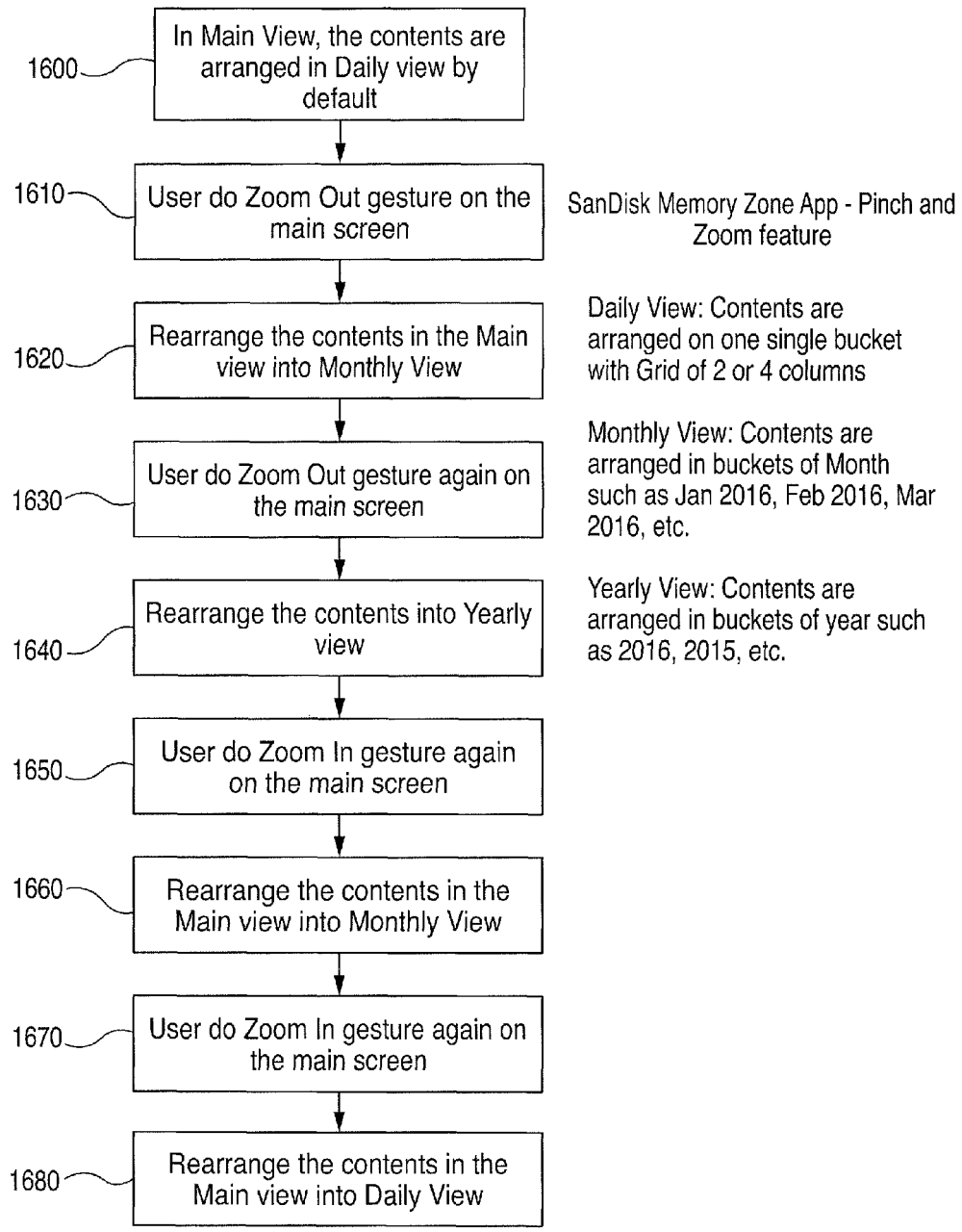
FIG. 16 is a flow chart of a method of an embodiment for pinch and zoom features.
Figure 17:
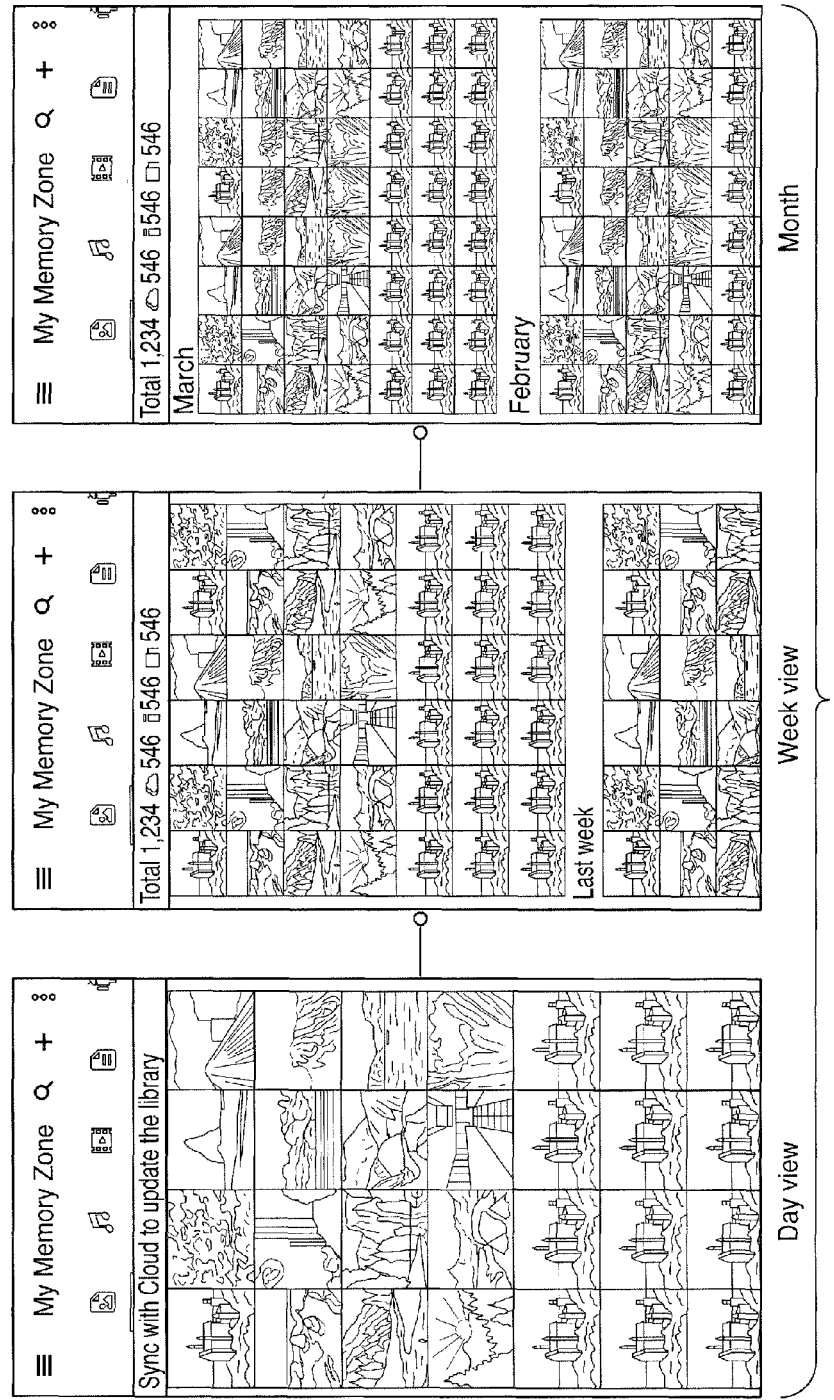
FIGS. 17-20 are screen shots of a unified media-centric user interface of an embodiment that illustrate the use of pinch and zoom features.
Figure 18:
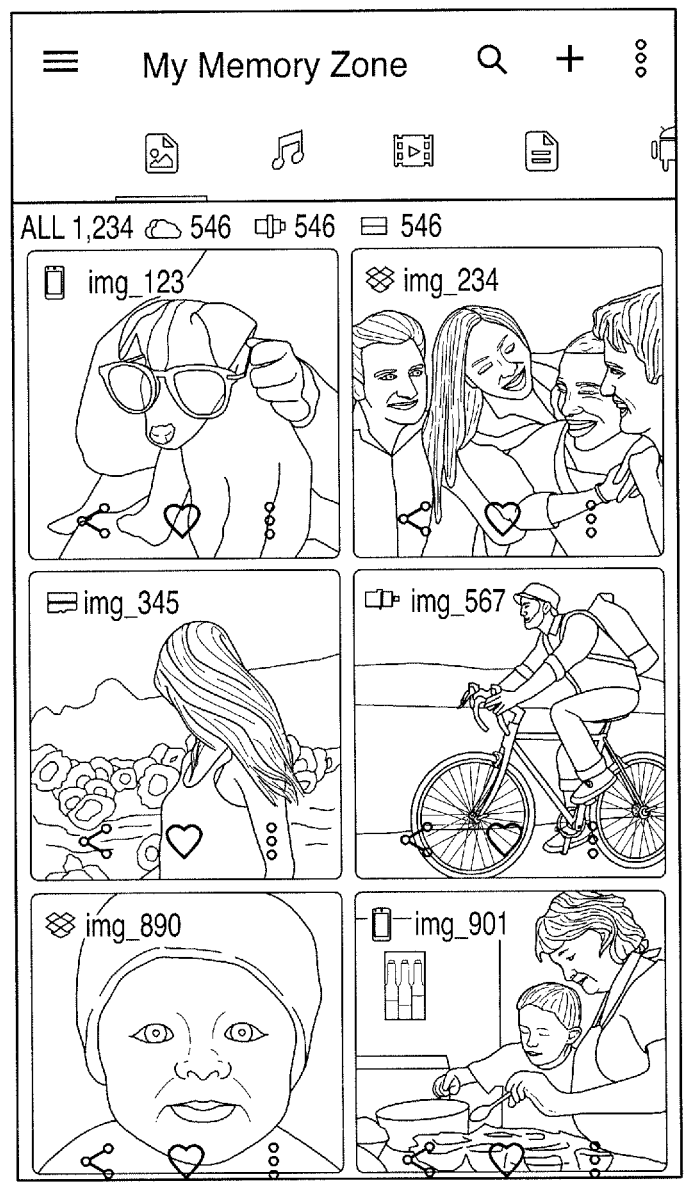
Figure 19:
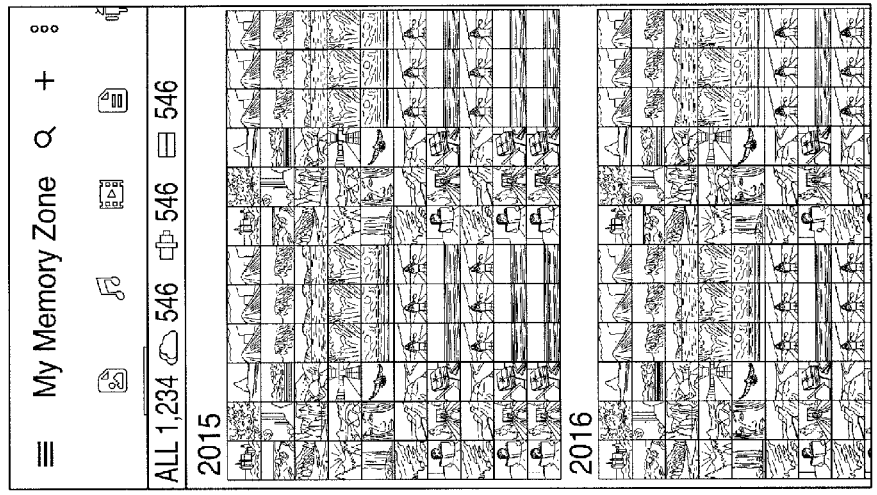
Figure 20:
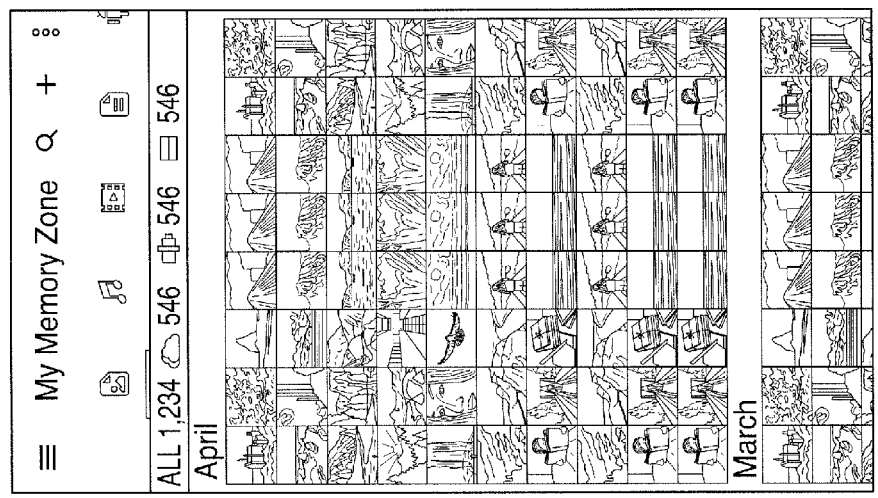
Figure 21:
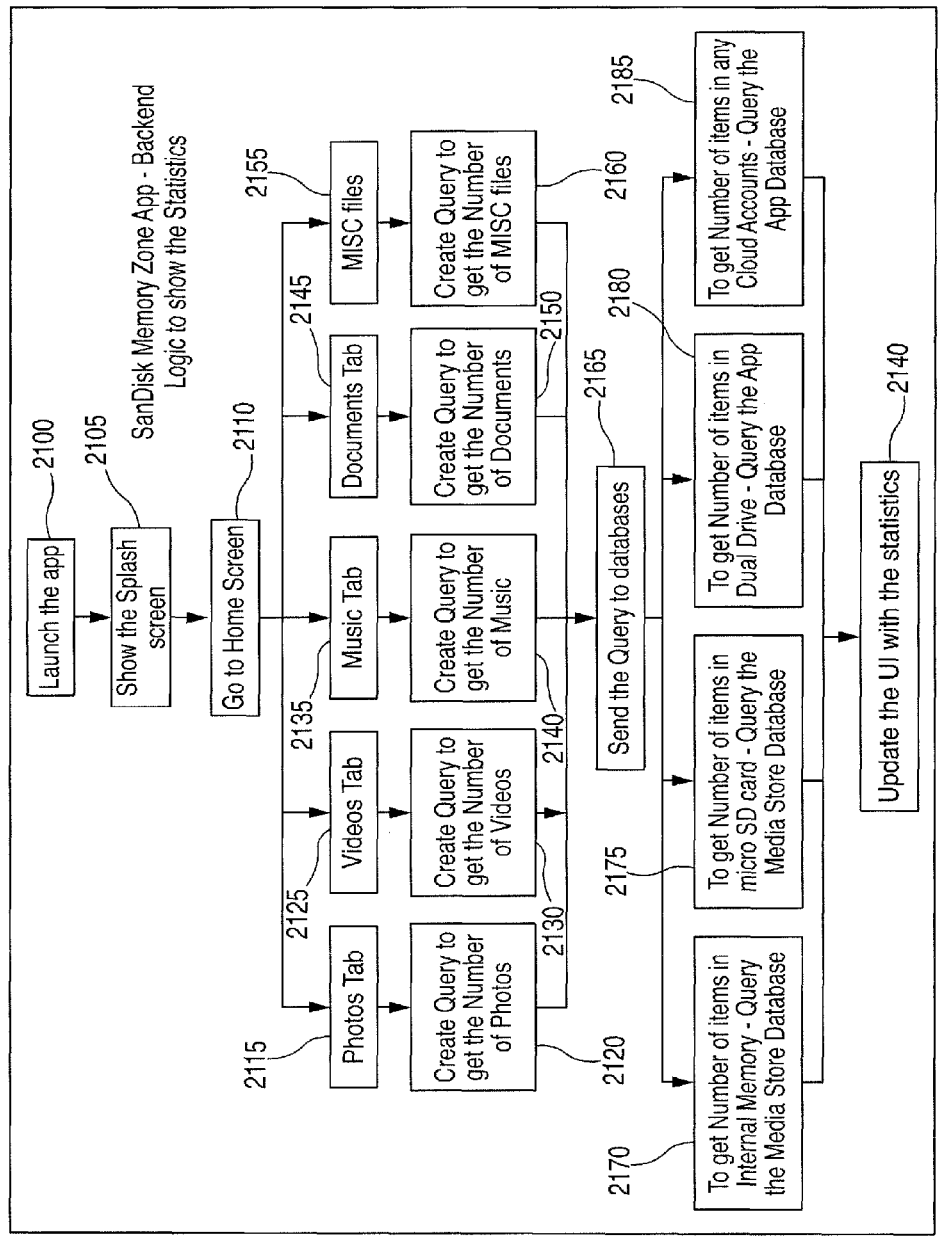
FIG. 21 is a flow chart of a method of an embodiment for backend logic to show statistics.
Figure 23:
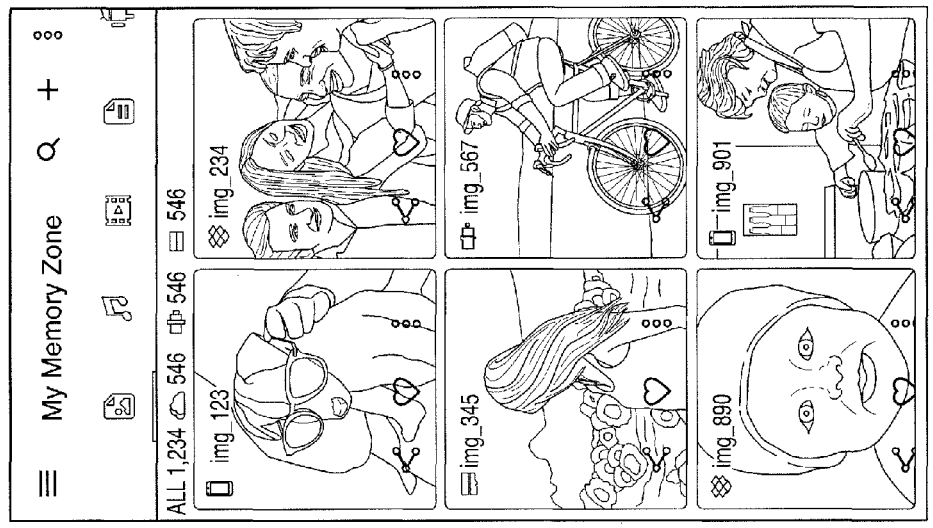
FIGS. 22-23 are screen shots that illustrate the embodiment of FIG. 21.
Figure 22:
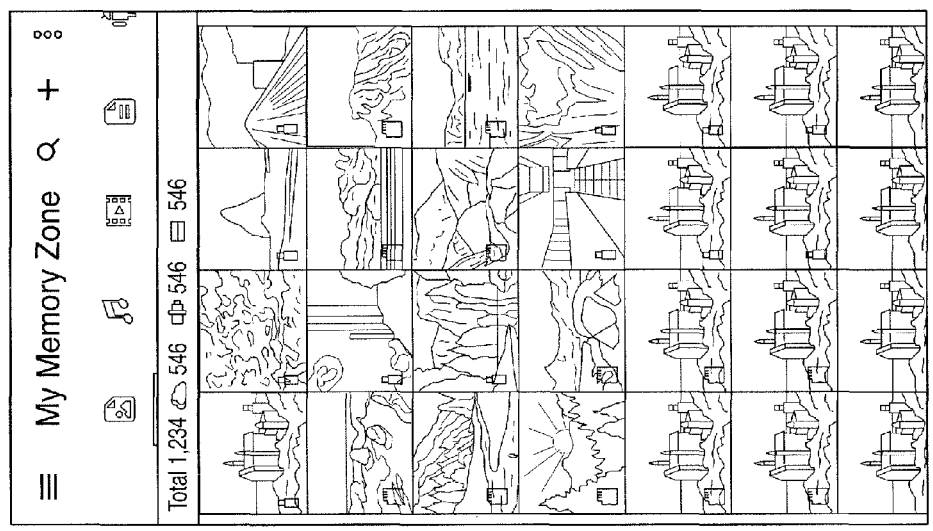
Figure 24:
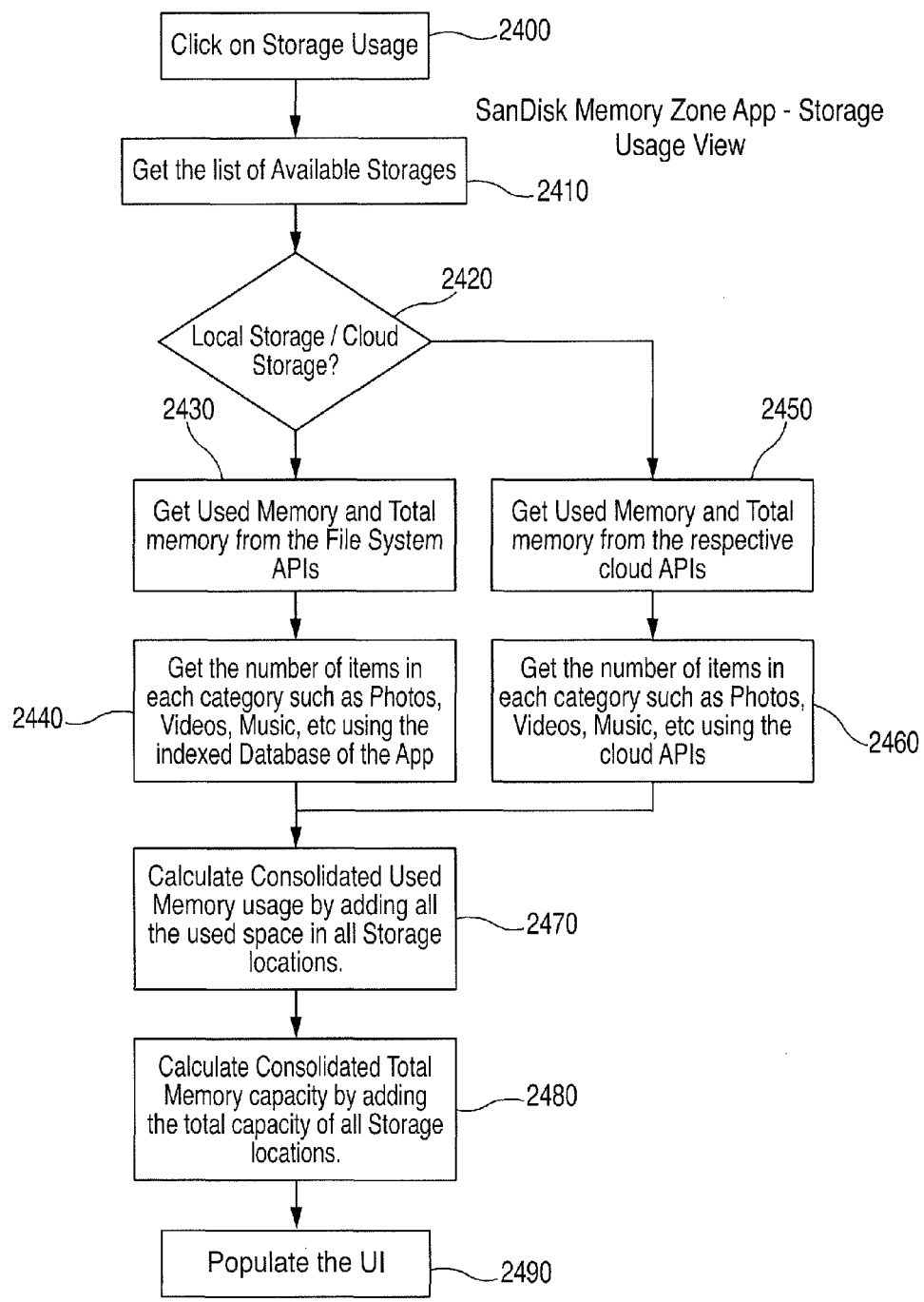
FIG. 24 is a flow chart of a method of an embodiment for implementing a storage usage view.
Figure 25:
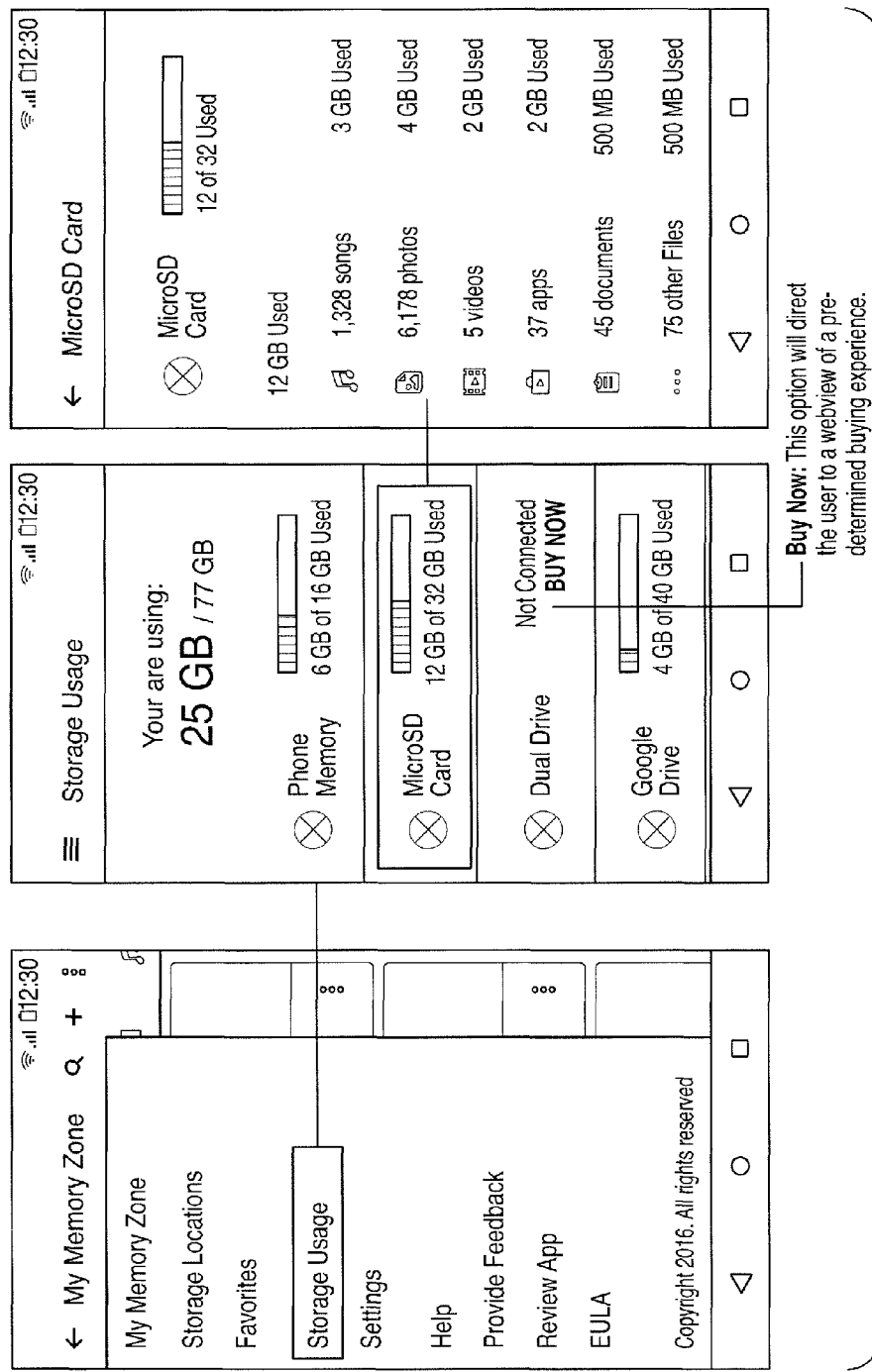
FIGS. 25-27 are screen shots that illustrate the embodiment of FIG. 24.
Figure 26:
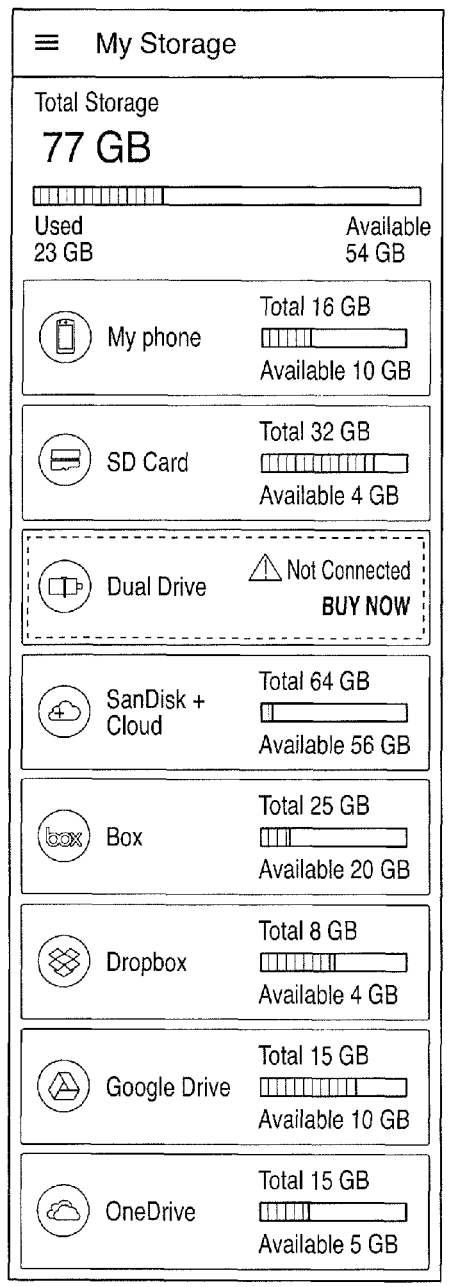
Figure 27:
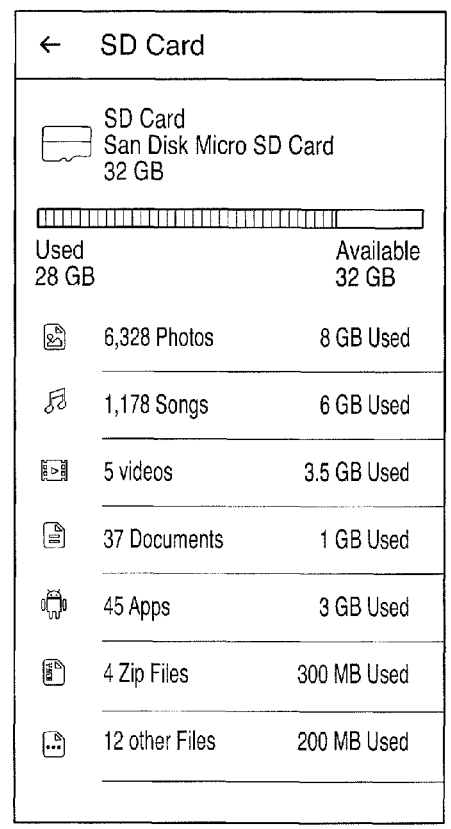
Figure 28:
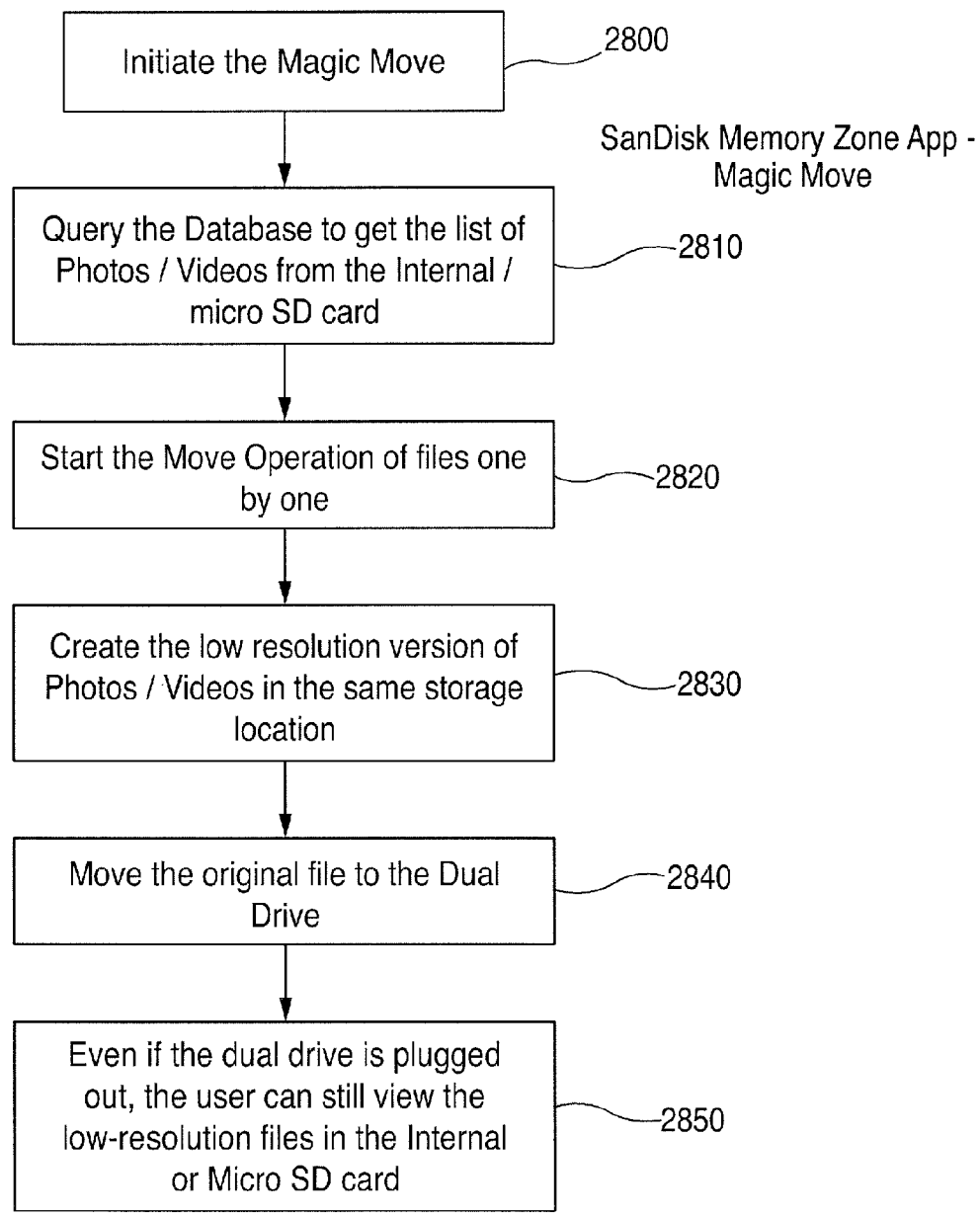
FIG. 28 is a flow chart of a method of an embodiment for magic move.
Figure 29:
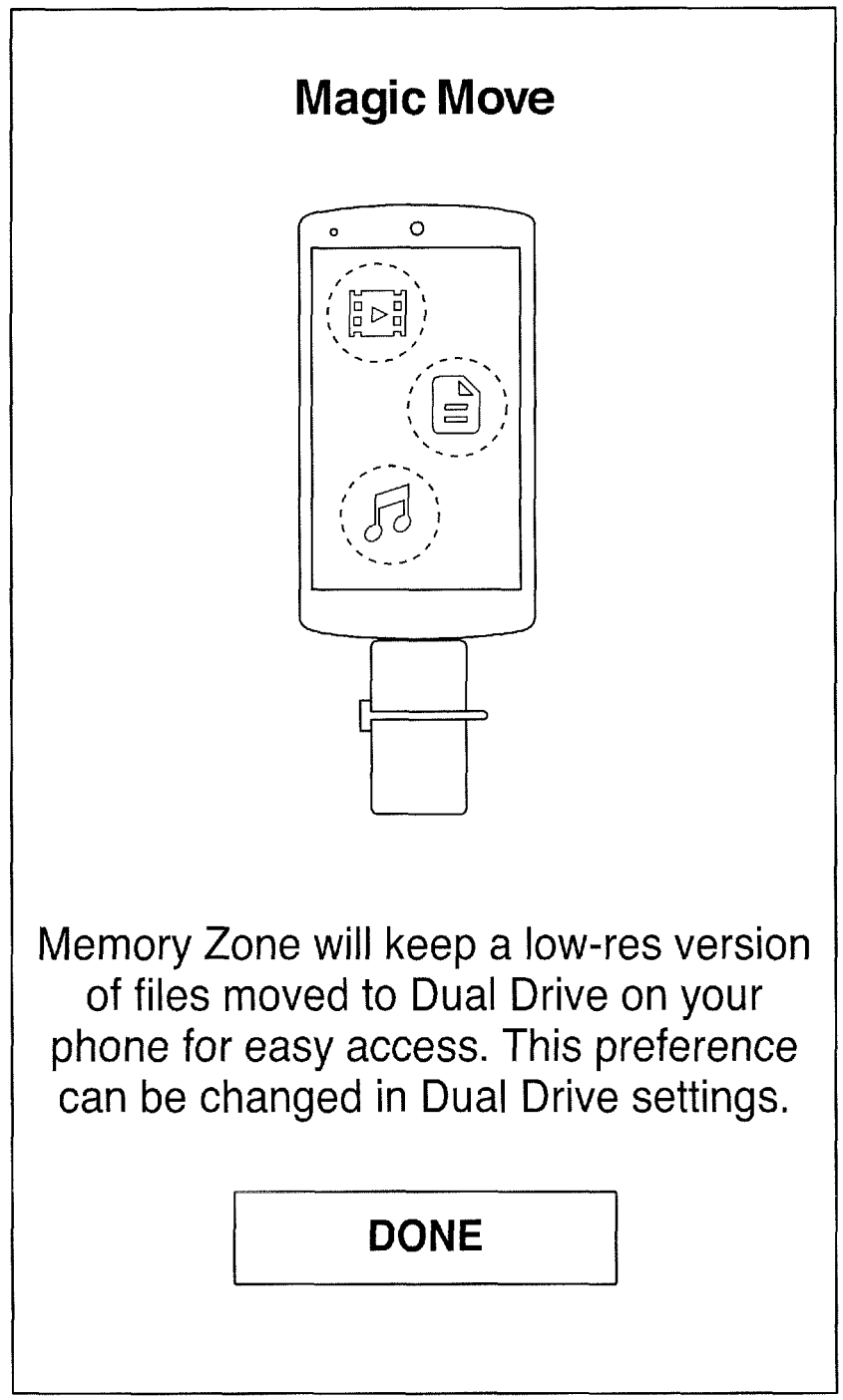
FIG. 29 is a screen shot of an embodiment for magic move.
Figure 30:
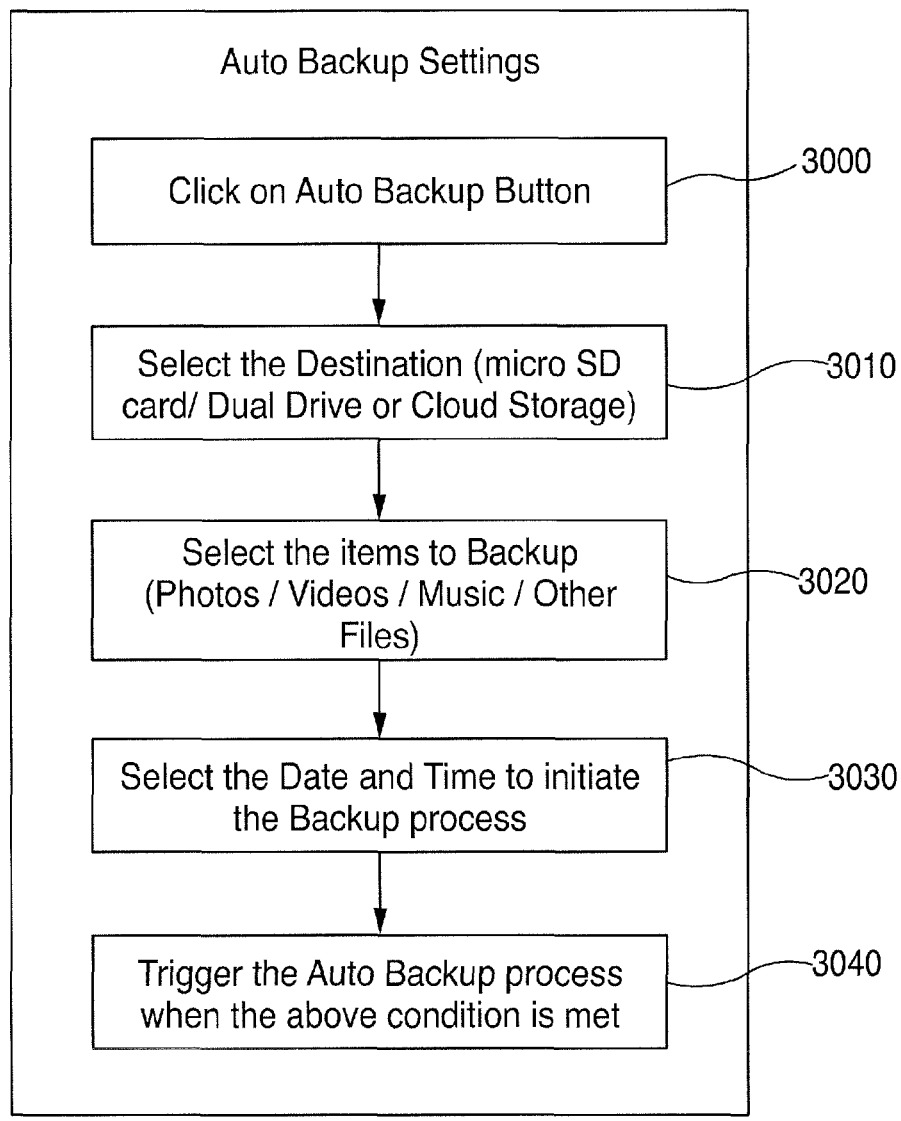
FIG. 30 is a flow chart of a method of an embodiment for auto backup settings.
Figure 31:
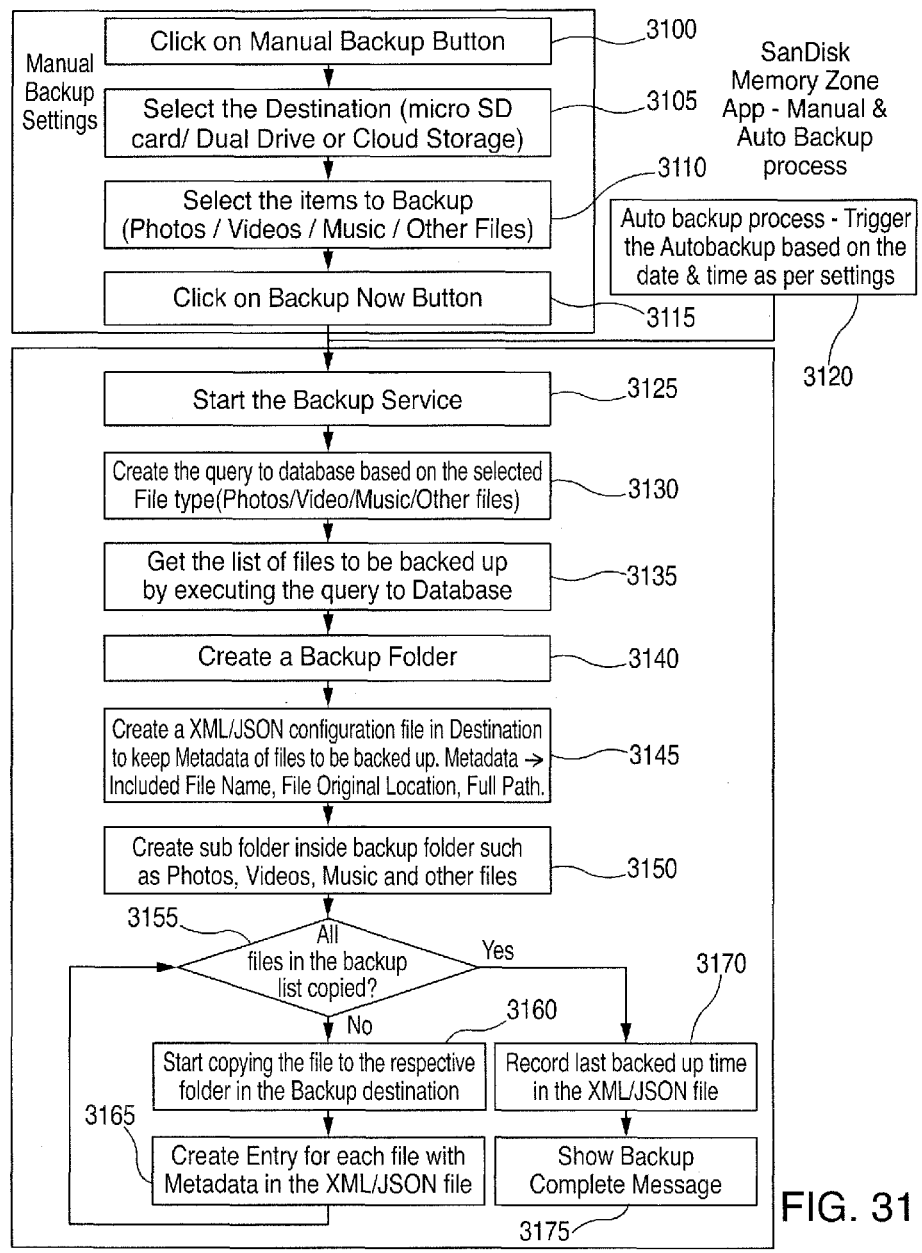
FIG. 31 is a flow chart of a method of an embodiment for manual and automatic backup processes.
Figure 36:
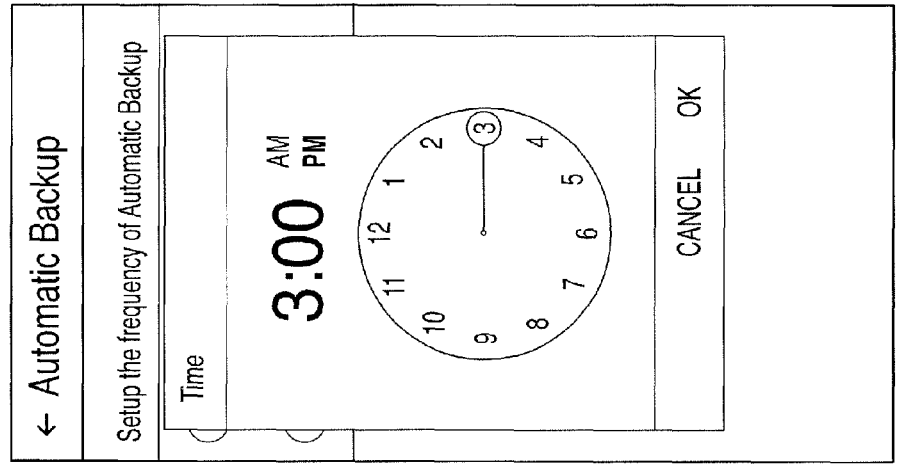
Figure 35:
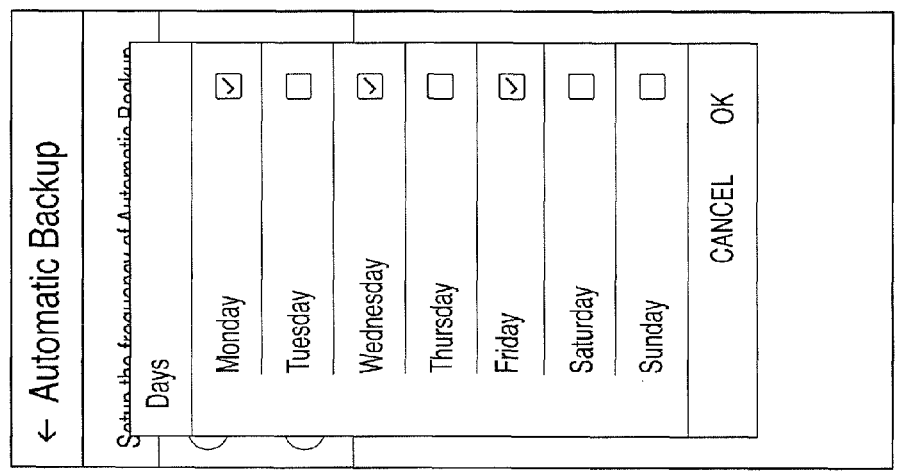
Figure 37:
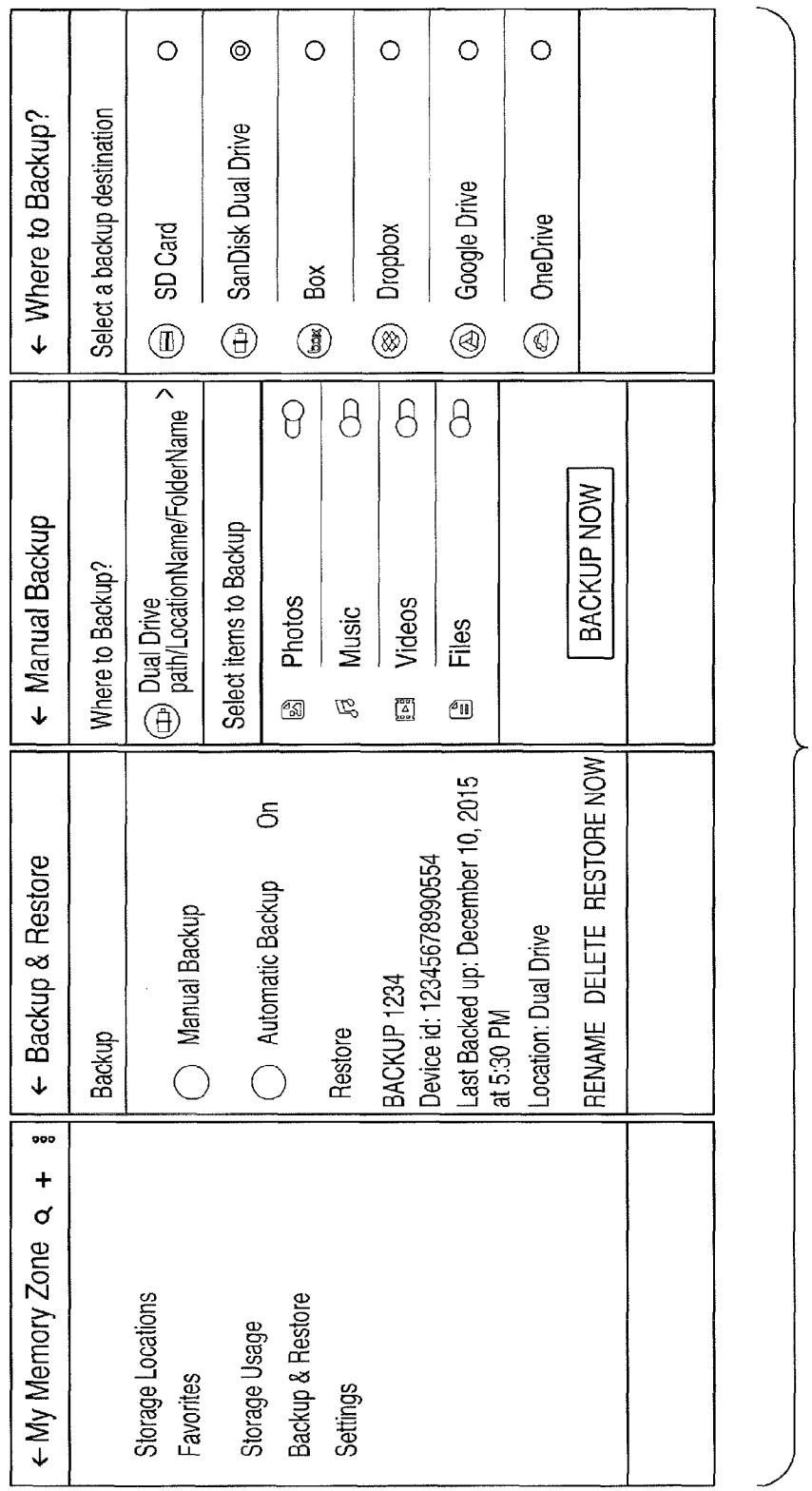
FIGS. 37-40 are screen shots that illustrate a manual backup process.
Figures 38, 39, 40:
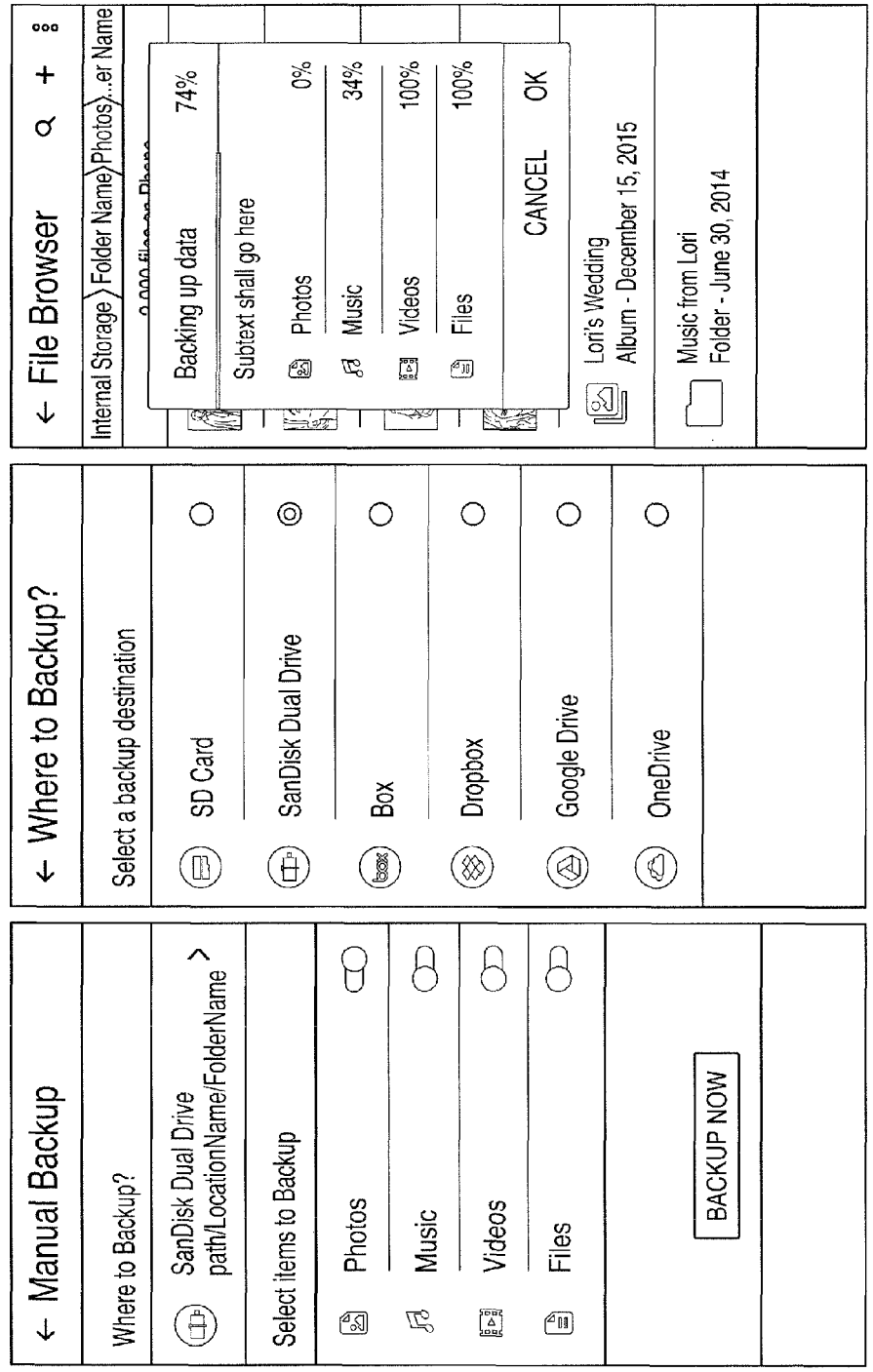

FIG. 2 is an illustration of a storage device 200 of an embodiment. This general diagram can describe a removable memory card, an external storage device, or a cloud-based storage device. Of course, different or other components specific to the type of device can be used. As shown in FIG. 2, the storage device 200 in one embodiment contains a controller 210 and non-volatile memory 220. In this embodiment, the controller 210 comprises a host interface 212 for placing the storage device 200 in communication with the mobile device 100, and a memory interface 211 for placing the controller 210 in communication with the memory 220. (As used herein, the phrase "in communication with" (or "operatively in communication with") could mean directly in communication with or indirectly in communication with through one or more components, which may or may not be shown or described herein.) The host interface 212 can take any suitable form, such as, but are not limited to, a SATA, SATA Express, SAS, Fibre Channel, USB, PCIe, and NVMe interface. The memory interface 211 can also take any suitable form, such as, but not limited to, a flash interface (e.g., Toggle Mode 200, 400, or 800).

The controller 210 also comprises a central processing unit (CPU) 213, an optional hardware crypto-engine 214 operative to provide encryption and/or decryption operations, read access memory (RAM) 215, read only memory (ROM) 216 which can store firmware for the basic operations of the storage device 240 and an application program interface, and a non-volatile memory (NVM) 217 which can store a device-specific key used for encryption/decryption operations, when used. The controller 210 can be implemented in any suitable manner. For example, the controller 210 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from SanDisk or other vendors. Also, some of the components shown as being internal to the controller 210 can also be stored external to the controller 210, and other components can be used. For example, the RAM 215 (or an additional RAM unit) can be located outside of the controller die and used as a page buffer for data read from and/or to be written to the memory 220.

The non-volatile memory 220 can also take any suitable form, as can the internal memory 130. For example, in one embodiment, a memory takes the form of a solid-state (e.g., flash) memory and can be one-time programmable, few-time programmable, or many-time programmable. The memory can also use single-level cell (SLC) or multiple-level cell (MLC). The memory can take the form of NAND Flash memory or of other memory technologies, now known or later developed.

In one embodiment, the app 125 provides a unified media-centric user interface to view and to backup content on a mobile device, microSD Card, on-the-go drive, and/or cloud storage services. As discussed above, Android users can save their content in multiple storage locations, such as internal memory, microSD cards (external), Dual USB drives (OTG), and in various cloud services (like Dropbox, Box, Google Drive, One drive etc.). When content is spread across multiple locations, users can easily lose track of their content as they do not get a holistic view of how/where their content is distributed. There is also no easy way to move the content between these storage end-points using a single application. The following embodiments provide a user interface that can be used to help solve these problems by providing a unified view of all storage locations and automatically categorizing user content into photos, videos, music, and documents, for example. This new interface allows users to understand and manage their storage better and also move content between phone, card, and cloud easily. Moreover, the app also allows users to backup content to the cloud or to the card based on user preference. This provides advantage over other solutions. For example, some other solutions that are currently available to consumers do not follow a media centric/unified view and are often limited to a basic file folder view. This makes navigation between different locations on a mobile user interface complex and frustrating for users. Also, some native Gallery apps offer a unified view of the internal and external storage (microSD) but do not offer a view of cloud and OTG drives. Other solutions do not offer backup based on user preferences to the card, cloud, and OTG drives.

In one embodiment, using the unified media centric user interface of the new memory zone app allows files from various memory sources to be indexed and classified into different file types and shown under a single common user interface. Users can easily toggle between photos, videos, music, and other file types and can also view files from all the storage end points in this unified user interface. The backup flow illustrates in detail the process a user would follow to set up his/her preference while backing up their phone content to various storage end-points.

In one embodiment, a unified view of the home screen is provided. In this embodiment, files from various memory sources are indexed and classified into different file types and shown under a single common user interface. This makes it easier to navigate between various file types such as photos, videos, music, and documents. As such, it is very simple for a non-technical user to use the app.

In another embodiment, the app allows navigating between various storage locations. As shown in the figures, the Navigation drawer will house a secondary option of "Storage Locations". Hardware and cloud accounts can be available in the storage location tab bar. The tab bar can show all the active hardware and authenticated cloud accounts first, respectively. Following this, the tab bar can show any inactive hardware (hardware that user does not have) and cloud accounts that are not logged in. These will show empty state, as shown in the drawings. Hardware can be listed with SD card first, and then dual drive. Cloud accounts can be listed alphabetically.

In another embodiment, the app allows dragging items to a collection/folder. Multiselecting allows the user to drag the files to a particular collection or folder. As the user starts dragging, selected files can animate and become grouped together into a stack in different ways depending on if it is in file type view or in storage view as explained below.

For a file type: The stack can duplicate above the selected items, as they will not live in their respective file type tab.

For a storage location: The stack can form and leave empty spaces where the selected files were. After the files are dropped into the folder, the remaining files in the view can reorganize to take up the empty spaces.

In another embodiment, the app provides a pinch and zoom feature. This feature allows a user to see photos in month wise and year wise. On zooming, the user can see photos in a 2 column layout from 4 column view, similarly from Yearly view to Monthly view to Daily view. With a pinch to monthly view, the first pinch (zoom out) allows user to see photos month wise. Now tapping in/Zooming in goes to daily view. With a pinch again to yearly view, the second pinch (zooming out) gives a yearly view of photos. One of the drawings shows a 12 column grid view. The user can tap once or zoom out to go back to the Month view and then to Daily view. So, zooming out results in a daily view to a monthly view or a yearly view, and zooming in results in a yearly view to a monthly view to a daily view.

In another embodiment, the app shows stats for each file type. In this embodiment, the total number of files from each memory location are shown along with the particular storage icons on top of the list view or grid view.

In another embodiment, there is a storage usage view from the app. This view will show a list of all storage locations that the user has, with current storage usage. Tapping on each storage item in the list will show the data for each of the individual storage accounts, including the number and amount of storage space used for each file type.

In another embodiment, the app provides manual and automatic backup. Users can backup his/her phone contents to various destinations such as micro SD card, Dual drive and the authenticated cloud storage accounts. The user can either do manual backup or setup automatic backup. The user can select the file types such as photos, videos, music, etc that can be backed up to a particular storage location. The user can also configure when the backup can happen by choosing the day and the time in the settings.

In another embodiment, the app provides a magic move, in which the app keeps the low-resolution version of the original files while moving. In this embodiment, the app can create low-resolution images/videos before moving files from Internal memory to Dual drive. The original file will be moved from the Internal Memory/micro SD card to Dual drive and create low-resolution images/videos in the same source memory location where the original file was there. There are several advantages of have a low-resolution file. For example, the user can view or browse the files in his/her phone when the dual drive is not connected. Also, this frees up space in the internal memory or micro SD card as the low-resolution images/videos will occupy only less space in the memory.

There are many advantages associated with these embodiments. For example, these embodiments can help users organize their contents from various memory sources and can view all files in one common centric media user interface. The embodiments also make it easy for user to do memory management of various memory sources either it can be a local storage or cloud storage. Additionally, since all files from all memory sources are sorted, it is easier for the user to find a particular photo or video. Further these embodiments allow users to backup their phone content to cloud, microSD card or USB drive easily.

These embodiments are further illustrated in the attached drawings.

Finally, as mentioned above, any suitable type of memory can be used. Semiconductor storage devices include volatile storage devices, such as dynamic random access memory ("DRAM") or static random access memory ("SRAM") devices, non-volatile storage devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of storage device may have different configurations. For example, flash storage devices may be configured in a NAND or a NOR configuration.

The storage devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash storage device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash storage devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single storage device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single storage device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple storage device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional storage device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) storage device levels. Alternatively, the memory elements may be coupled together to form a vertical NAND string that traverses across multiple horizontal storage device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more storage device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each storage device level of the array are typically formed on the layers of the underlying storage device levels of the array. However, layers of adjacent storage device levels of a monolithic three dimensional memory array may be shared or have intervening layers between storage device levels.

Then again, two dimensional arrays may be formed separately and then packaged together to form a non-monolithic storage device having multiple layers of memory. For example, non-monolithic stacked memories can be constructed by forming memory levels on separate substrates and then stacking the memory levels atop each other. The substrates may be thinned or removed from the storage device levels before stacking, but as the storage device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip storage device.

Associated circuitry is typically required for operation of the memory elements and for communication with the memory elements. As non-limiting examples, storage devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A mobile device comprising:
a display device; and
a controller in communication with the display device and a plurality of storage devices, wherein the controller is configured to:
categorize files stored in the plurality of storage devices into different file types;
display, on the display device, a plurality of user-selectable regions, wherein each user-selectable region is associated with a different file type;
receive a user selection of one of the user-selectable regions;
display representations of at least some files of the file type associated with the received user selection, wherein each representation includes an indication of which storage device stores a file represented by the representation; and
display a plurality of indicia on the display device, each indicia representing one of the plurality of storage devices and indicating how many files are stored in that storage device of the file type associated with the received user selection.

2. The mobile device of claim 1, wherein the plurality of storage devices include one or more of the following: a memory internal to the mobile device, a removable memory device, an external storage device, and a cloud-based storage device.

3. The mobile device of claim 1, wherein the controller is configured to categorize the files and display the plurality of indicia by executing an application.

4. The mobile device of claim 1, wherein the controller is further configured to provide a pinch and zoom feature.

5. The mobile device of claim 1, wherein the controller is further configured to:
receive a user selection of one of the plurality of storage devices; and
display files stored in the selected one of the plurality of storage devices.

6. The mobile device of claim 5, wherein the controller is further configured to:
receive a user selection of a plurality of files from the selected one of the plurality of storage devices; and
receive an input from a user as to which storage device the selected plurality of files are to be moved to.

7. The mobile device of claim 6, wherein the controller is further configured to:
responsive to a selected file being an image being moved from internal memory in the mobile device to another storage device, create a lower-resolution version of the image for storage in the internal memory.

8. The mobile device of claim 1, wherein the controller is further configured to provide storage statistics for each of the storage devices.

9. The mobile device of claim 1, wherein the controller is further configured to backup selected files to a selected storage device.

10. The mobile device of claim 1, wherein at least one of the plurality of storage devices comprises a three-dimensional memory.

11. A method comprising:
performing the following in a mobile device comprising a display device:
displaying, on the display device, a plurality of user-selectable regions, wherein each user-selectable region is associated with a different file type;
receiving a user selection of a user-selectable region that is associated with an image file type;
displaying, on the display device, a view of images associated with the user-selected region, wherein the images are stored on a plurality of storage devices;
displaying, on the display device, information about how many images are stored on each of the plurality of storage devices, wherein at least one image is stored in an internal memory of the mobile device; and creating a lower-resolution version of the at least one image for storage in the internal memory of the mobile device responsive to a user requesting that the at least one image be moved from the internal memory of the mobile device to any other one of the plurality of storage devices.

12. The method of claim 11, wherein the plurality of storage devices include one or more of the following: a memory internal to the mobile device, a removable memory device, an external storage device, and a cloud-based storage device.

13. The method of claim 11, wherein the method is performed by an application running on the mobile device.

14. The method of claim 11 further comprising providing a pinch and zoom feature.

15. The method of claim 11 further comprising backing up selected images to a selected storage device.

16. A mobile device comprising:
a display device;
means for categorizing files stored in a plurality of storage devices into different file types;
means for displaying, on the display device, a plurality of user-selectable regions, wherein each user-selectable region is associated with a different file type;
means for receiving a user selection of one of the user-selectable regions;
means for displaying representations of at least some files of the file type associated with the received user selection, wherein each representation includes an indication of which storage device stores a file represented by the representation; and
means for displaying a plurality of indicia on the display device, each indicia representing one of the plurality of storage devices and indicating how many files are stored in that storage device of the file type associated with the received user selection.

17. The mobile device of claim 16, wherein at least one of the means comprises computer readable program code executed by a processor.

18. The mobile device of claim 16, wherein at least one of the plurality of storage devices comprises a three-dimensional memory.

* * * * *